United States Patent
Hong et al.

(10) Patent No.: US 12,232,687 B2
(45) Date of Patent: Feb. 25, 2025

(54) CLEANING ROBOT AND METHOD OF PERFORMING TASK THEREOF

(71) Applicant: Samsung Electronics Co., Ltd., Suwon-si (KR)

(72) Inventors: Soonhyuk Hong, Suwon-si (KR); Minjeong Kang, Suwon-si (KR); Sejin Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 17/735,660

(22) Filed: May 3, 2022

(65) Prior Publication Data

US 2022/0257077 A1 Aug. 18, 2022

Related U.S. Application Data

(63) Continuation of application No. 16/727,532, filed on Dec. 26, 2019, now Pat. No. 11,350,809.

(30) Foreign Application Priority Data

Dec. 26, 2018 (KR) .......................... 10-2018-0169914

(51) Int. Cl.
*A47L 9/28* (2006.01)
*A47L 9/00* (2006.01)
*G05D 1/00* (2024.01)

(52) U.S. Cl.
CPC ............ *A47L 9/2852* (2013.01); *A47L 9/009* (2013.01); *A47L 9/2826* (2013.01);
(Continued)

(58) Field of Classification Search
CPC ...... A47L 9/2852; A47L 9/009; A47L 9/2826; A47L 2201/04; A47L 2201/06;
(Continued)

(56) References Cited

U.S. PATENT DOCUMENTS 5,570,285 A * 10/1996 Asaka .................. G05D 1/0214
180/169
6,169,572 B1 * 1/2001 Sogawa ................. G06V 20/58
348/113
(Continued)

FOREIGN PATENT DOCUMENTS

CN 106983460 A 7/2017
CN 108247647 A 7/2018
(Continued)

OTHER PUBLICATIONS

Chinese Office Action dated Oct. 11, 2023, issued in Chinese Patent Application No. 201980086406.7.
(Continued)

*Primary Examiner* — Bhavesh V Amin
(74) *Attorney, Agent, or Firm* — Jefferson IP Law, LLP

(57) ABSTRACT

A method, performed by a cleaning robot, of performing a task, is provided. The method includes capturing an image of an object in a vicinity of the cleaning robot, determining a task to be performed by the cleaning robot, by applying the captured image to at least one trained artificial intelligence (AI) model, controlling a guard portion to descend from in front of an opened portion to a floor surface of the cleaning robot, according to the determined task, and driving towards the object so the object is moved by the descended guard portion.

13 Claims, 31 Drawing Sheets

(52) U.S. Cl.
CPC ......... *G05D 1/0212* (2013.01); *G05D 1/0231* (2013.01); *A47L 2201/04* (2013.01); *A47L 2201/06* (2013.01); *G05D 1/0038* (2013.01)

(58) Field of Classification Search
CPC ............. A47L 11/4011; A47L 2201/00; G05D 1/0212; G05D 1/0231; G05D 1/0038; G05D 1/0221; G05D 1/0246; G06V 20/10; B25J 9/1661; B25J 9/161; B25J 9/1664; B25J 9/1697; B25J 11/0085
See application file for complete search history.

(56) References Cited

U.S. PATENT DOCUMENTS

| | | | |
|---|---|---|---|
| 6,173,215 B1* | 1/2001 | Sarangapani | G05D 1/024 700/250 |
| 6,481,515 B1 | 11/2002 | Kirkpatrick et al. | |
| 6,529,806 B1* | 3/2003 | Licht | G05D 1/0227 700/250 |
| 7,444,214 B2* | 10/2008 | Cho | A47L 9/009 701/72 |
| 7,474,941 B2 | 1/2009 | Kim et al. | |
| 7,532,109 B2* | 5/2009 | Takahama | G01S 17/931 701/1 |
| 7,818,090 B2* | 10/2010 | Okamoto | G05D 1/0272 700/255 |
| 7,844,398 B2* | 11/2010 | Sato | B25J 9/1666 700/214 |
| 8,019,475 B2* | 9/2011 | Kuroda | G05D 1/0214 700/255 |
| 8,204,679 B2* | 6/2012 | Nakamura | B62D 57/032 901/1 |
| 8,793,069 B2* | 7/2014 | Kuroda | G01S 11/12 700/250 |
| 8,918,241 B2* | 12/2014 | Chen | G05D 1/0225 701/25 |
| 8,972,057 B1* | 3/2015 | Freeman | G01C 21/34 700/250 |
| 8,972,061 B2* | 3/2015 | Rosenstein | G06T 7/00 901/1 |
| 9,020,637 B2* | 4/2015 | Schnittman | G05D 1/0227 382/106 |
| 9,408,515 B2* | 8/2016 | Rosenstein | G06T 7/90 |
| 9,434,074 B2* | 9/2016 | Tanigawa | B25J 9/1666 |
| 10,335,003 B2 | 7/2019 | Dabrowski | |
| 10,492,654 B2 | 12/2019 | Frey | |
| 10,676,022 B2* | 6/2020 | Zevenbergen | G01C 21/3461 |
| 10,908,615 B2* | 2/2021 | Nishimura | B25J 9/162 |
| 11,292,132 B2* | 4/2022 | Mao | B25J 9/1666 |
| 11,637,968 B2* | 4/2023 | Lyu | B25J 9/0003 348/207.99 |
| 2003/0174054 A1* | 9/2003 | Shimomura | G01S 13/931 250/526 |
| 2004/0073368 A1* | 4/2004 | Gonzalez-Banos | G05D 1/0274 701/301 |
| 2005/0021181 A1 | 1/2005 | Kim et al. | |
| 2005/0171637 A1* | 8/2005 | Tani | G05D 1/027 701/23 |
| 2006/0058921 A1* | 3/2006 | Okamoto | G05D 1/0272 701/25 |
| 2006/0106496 A1* | 5/2006 | Okamoto | G05D 1/0278 700/255 |
| 2006/0115113 A1* | 6/2006 | Lages | G01S 3/7864 382/199 |
| 2008/0249662 A1* | 10/2008 | Nakamura | G05D 1/0214 901/1 |
| 2008/0269973 A1* | 10/2008 | Kuroda | G05D 1/0214 701/26 |
| 2009/0043440 A1* | 2/2009 | Matsukawa | G05D 1/0214 701/25 |
| 2009/0173561 A1* | 7/2009 | Moriguchi | B25J 5/007 901/1 |
| 2009/0234527 A1* | 9/2009 | Ichinose | G05D 1/024 701/23 |
| 2010/0082194 A1* | 4/2010 | Yabushita | G05D 1/0274 701/25 |
| 2010/0217528 A1* | 8/2010 | Sato | G05D 1/0214 701/300 |
| 2010/0222925 A1* | 9/2010 | Anezaki | G05D 1/0221 700/253 |
| 2010/0235033 A1* | 9/2010 | Yamamoto | G05D 1/024 701/26 |
| 2013/0206177 A1 | 8/2013 | Burlutskiy | |
| 2014/0124004 A1* | 5/2014 | Rosenstein | G06T 7/00 15/3 |
| 2014/0129027 A1* | 5/2014 | Schnittman | G05D 1/0219 700/253 |
| 2015/0120128 A1* | 4/2015 | Rosenstein | G06T 7/246 701/28 |
| 2017/0001309 A1 | 1/2017 | Passot et al. | |
| 2017/0112345 A1 | 4/2017 | Frey | |
| 2018/0210445 A1 | 7/2018 | Choi et al. | |
| 2018/0288320 A1* | 10/2018 | Melick | G01S 13/931 |
| 2018/0348374 A1* | 12/2018 | Laddha | G01S 17/931 |
| 2018/0353042 A1* | 12/2018 | Gil | A47L 11/4044 |
| 2018/0354132 A1* | 12/2018 | Noh | B25J 9/1676 |
| 2019/0072985 A1* | 3/2019 | Taveira | G08G 1/164 |
| 2019/0073912 A1* | 3/2019 | Mellinger, III | G05D 1/106 |
| 2019/0187703 A1* | 6/2019 | Millard | G05D 1/249 |
| 2019/0205609 A1* | 7/2019 | Taveira | G08G 5/0013 |
| 2019/0310651 A1* | 10/2019 | Vallespi-Gonzalez | G01S 17/58 |
| 2019/0320867 A1 | 10/2019 | Noh et al. | |
| 2019/0343354 A1* | 11/2019 | Hong | A47L 9/2857 |
| 2019/0365176 A1* | 12/2019 | Kim | B25J 11/0085 |
| 2019/0369628 A1* | 12/2019 | Kim | G05D 1/0221 |
| 2019/0370691 A1* | 12/2019 | Chae | A47L 11/4061 |
| 2019/0378283 A1* | 12/2019 | Boult | G06N 20/00 |
| 2019/0389057 A1* | 12/2019 | Chae | G06N 20/00 |
| 2019/0392254 A1* | 12/2019 | Oh | G06N 7/01 |
| 2020/0089249 A1 | 3/2020 | Furuta et al. | |
| 2020/0205629 A1 | 7/2020 | Hong et al. | |
| 2023/0241783 A1* | 8/2023 | Zhang | B25J 11/0085 700/253 |

FOREIGN PATENT DOCUMENTS

| | | |
|---|---|---|
| JP | 2012-231937 A | 11/2012 |
| JP | 2017-143901 A | 8/2017 |
| JP | 2017-144301 A | 8/2017 |
| KR | 10-2018-0058511 A | 6/2018 |
| KR | 10-2018-0134155 A | 12/2018 |
| WO | 2018/097574 A1 | 5/2018 |

OTHER PUBLICATIONS

European Notice of Allowance dated Oct. 19, 2023, issued in European Patent Application No. 19904904.0.
Korean Office Action dated Oct. 20, 2023, issued in Korean Patent Application No. 10-2018-0169914.
International Search Report dated Apr. 6, 2020, issued in International Application No. PCT/KR2019/095053.
Chun et al., Floor detection based depth estimation from a single indoor scene, 2013 IEEE International Conference on Image Processing https://pdfs.semanticscholar.org/a2ae/b676397b1492eba7aeac7d51d23ffe685685.pdf.
European Search Report dated Nov. 17, 2021, issued in European Application No. 19904904.0.
Korean Office Action dated Jun. 24, 2024, issued in Korean Patent Application No. 10-2018-0169914.
Extended European Search Report dated Jul. 1, 2024, issued in European Patent Application No. 24163796.6.
Korean Notice of Allowance dated Sep. 30, 2024, issued in Korean Patent Application No. 10-2018-0169914.

* cited by examiner

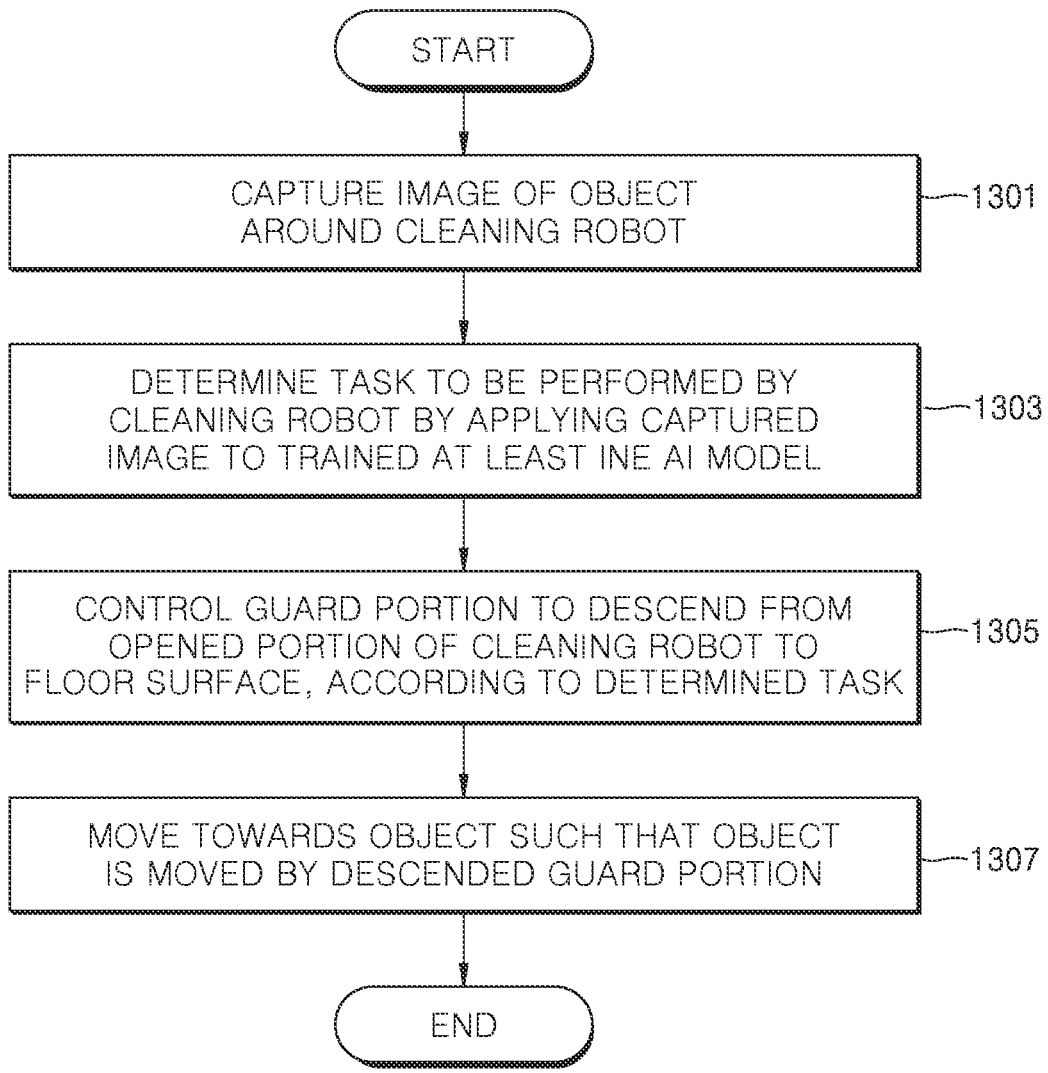

CLEANING ROBOT AND METHOD OF PERFORMING TASK THEREOF

CROSS-REFERENCE TO RELATED APPLICATION(S)

This application is a continuation application of prior application Ser. No. 16/727,532, filed on Dec. 26, 2019, which is based on and claims priority under 35 U.S.C. § 119(a) of a Korean patent application number 10-2018-0169914, filed on Dec. 26, 2018, in the Korean Intellectual Property Office, the disclosure of which is incorporated by reference herein in its entirety.

BACKGROUND

1. Field

The disclosure relates to a cleaning robot and a method of performing a task of the cleaning robot. More particularly, the disclosure relates to a cleaning robot capable of providing a suitable task by using information about an object (for example, an obstacle) in a vicinity of a cleaning robot and a method of controlling the cleaning robot.

2. Description of Related Art

With the development of robot technology, the supply of robots is becoming more common not only in specialized academic fields or industrial fields that require a large labor force, but also in general households. Service robots, cleaning robots, pet robots, and the like, which provide housekeeping services to users, are being widely supplied.

More particularly, in the case of a cleaning robot, it is very important to specifically determine information related to an object, such as a foreign body, a structure, an obstacle, or the like in a vicinity of the cleaning robot, and perform a task suitable for each object. A general cleaning robot has a limitation, due to a limited sensor combination, in obtaining specific information of an object. In other words, the general cleaning robot performs only avoidance driving of a same pattern depending on only on a sensing ability of a sensor without information about an object.

In this regard, there is a need to determine an optimum task of a cleaning robot based on an object in the vicinity of the cleaning robot and in addition, to differentiate driving and avoiding methods.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for a cleaning robot performing an optimum task based on an object in a vicinity of the cleaning robot. More particularly, provided are a cleaning robot identifying an object in the vicinity of the cleaning robot and performing an optimum task based on an attribute of the identified object, and a method of performing a task thereof.

Additional aspects will be set forth in part in the description which follows and, in part, will be apparent from the description, or may be learned by practice of the presented embodiments.

In accordance with an aspect of the disclosure, a method, performed by a cleaning robot, of performing a task is provided. The method includes capturing an image of an object in the vicinity of the cleaning robot, determining a task to be performed by the cleaning robot, by applying the captured image to a trained at least one artificial intelligence (AI) model, controlling a guard portion to descend from in front of an opened portion to a floor surface of the cleaning robot, according to the determined task, and driving towards the object such that the object is moved by the descended guard portion.

In accordance with another aspect of the disclosure, a cleaning robot is provided. The cleaning robot includes a camera, a driver, a guard portion provided in front of an opened portion of the cleaning robot, and at least one processor. The at least one processor may be configured to control the camera to capture an image of an object in the vicinity of the cleaning robot, determine a task to be performed by the cleaning robot by applying the captured image to a trained at least one artificial intelligence (AI) model, control the guard portion to descend from in front of the opened portion to a floor surface, according to the determined task, and control the driver to drive the cleaning robot towards the object to move the object by using the descended guard portion.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16 is a flowchart of a method of performing a task by a cleaning robot according to an embodiment of the disclosure.

Throughout the drawings, like reference numerals will be understood to refer to like parts, components, and structures.

DETAILED DESCRIPTION

Figure 1A:
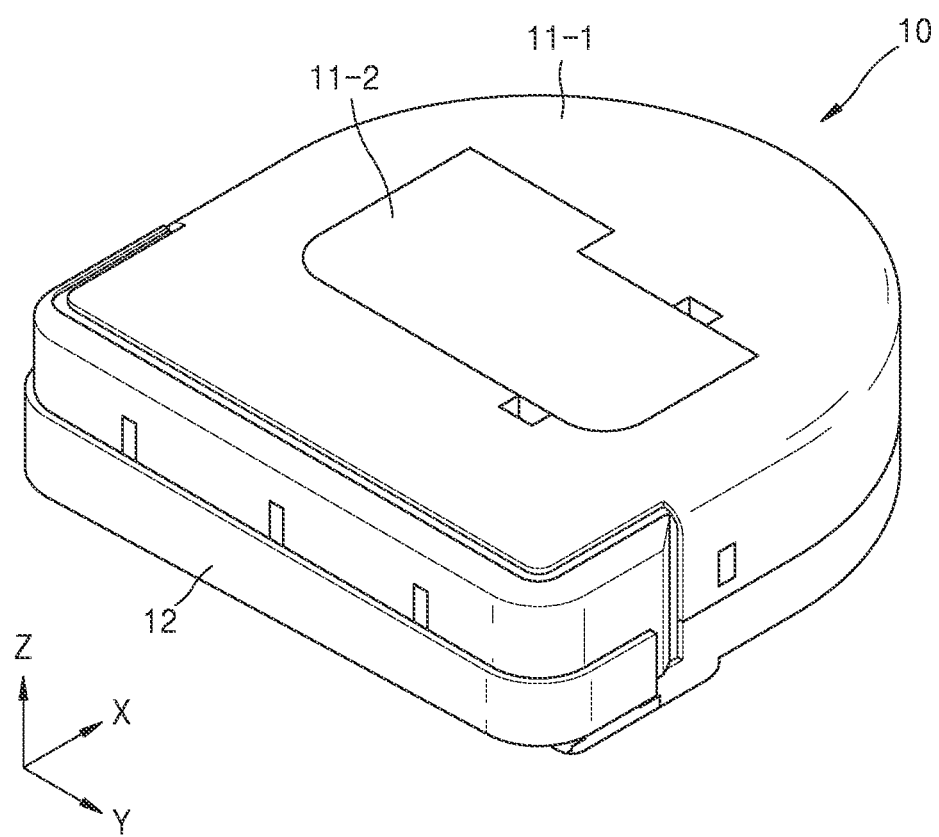
FIG. 1A is a perspective view of a cleaning robot when a guard portion is ascended according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the expressions, such as "first," "second," and the like used in the specification may modify various components regardless of an order and/or importance, and may distinguish one component from another without limiting the components. For example, a first user device and a second user device may indicate different user devices regardless of the order or importance. For example, without departing from the scope of rights described in the specification, a first component may be referred to as a second component, and similarly, a second component may be referred to as a first component.

When one component (such as a first component) is referred to as being "(operatively or communicatively) coupled with/to" or "connected to" another component (such as a second component), it should be understood that the one component is directly coupled to the other component or coupled through another component (such as a third component). On the other hand, when a component (such as a first component) is referred to as being "directly coupled to" or "directly connected to" another component (such as a second component), it may be understood that there is no component (such as a third component) between the one component and the other component.

Throughout the disclosure, the expression "at least one of a, b or c" indicates only a, only b, only c, both a and b, both a and c, both b and c, all of a, b, and c, or variations thereof.

The terms used herein may be used only to describe particular embodiments of the disclosure and may not be intended to limit the scope of other embodiments of the disclosure. Singular expressions may include plural expressions unless the context clearly indicates otherwise. The terms used herein, including technical or scientific terms, may have the same meaning as commonly understood by one of ordinary skill in the art. Among the terms used in herein, terms defined in a general dictionary may be interpreted as having the same or similar meanings as the meanings in the context of the related art, and should not be interpreted as having ideally or excessively formal meanings unless clearly defined herein. In some cases, even when terms are defined in the specification, the terms should not be interpreted to exclude embodiments of the disclosure.

Hereinafter, various embodiments of the disclosure will be described with reference to the accompanying drawings.

FIGS. 1A through 4B are diagrams showing a structure of a cleaning robot 10, according to various embodiments of the disclosure.

Figure 1B:
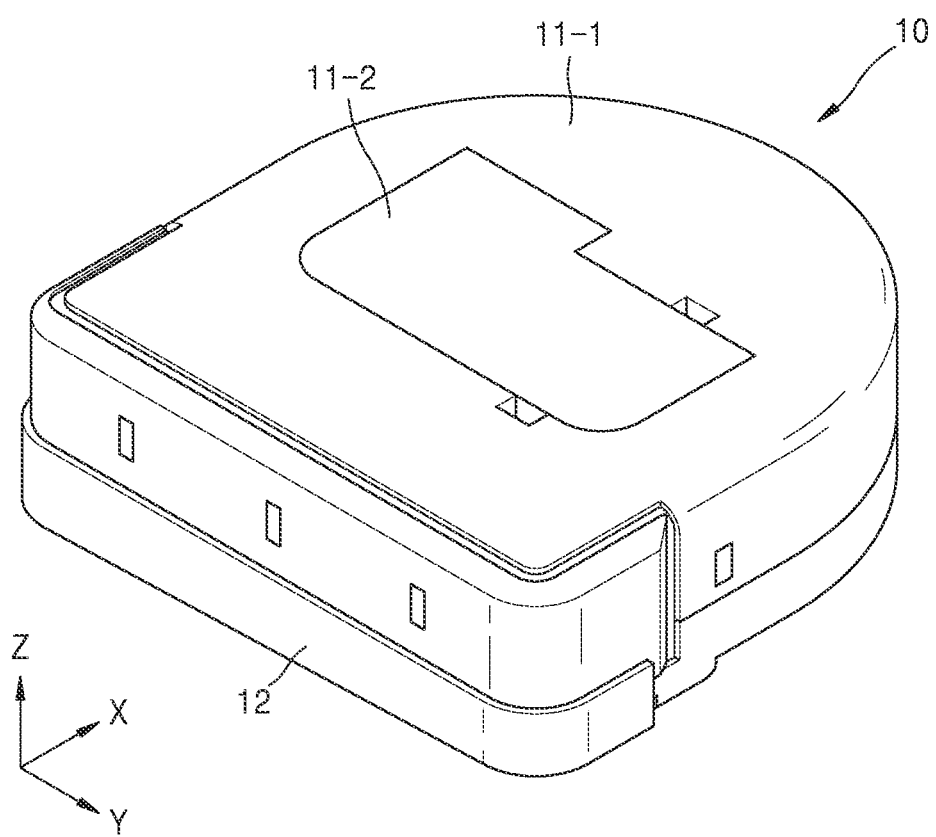
FIG. 1B is a perspective view of a cleaning robot when a guard portion is descended according to an embodiment of the disclosure.

FIG. 1A is a perspective view of a cleaning robot when a guard portion is ascended and FIG. 1B is a perspective view of a cleaning robot when a guard portion is descended according to various embodiments of the disclosure.

Referring to FIGS. 1A and 1B, the cleaning robot 10 is an apparatus for providing a cleaning service to a user while moving by itself, and may include a household cleaning robot, a large building cleaning robot, or an airport cleaning robot. In addition, the cleaning robot 10 may have various shapes, such as a cylindrical shape, a rectangular parallelepiped shape, and the like according to purposes. According to an embodiment of the disclosure, the cleaning robot 10 may perform not only a task of simply removing a foreign body from the floor, but also a task of moving an object.

The cleaning robot 10 may include a body 11-1 and a dust container 11-2 coupled to the body 11-1. The dust container 11-2 may be separated from the body 11-1.

The cleaning robot 10 may be provided to suck dust on a floor surface together with the air, while moving along the floor surface. The cleaning robot 10 may separate and store the dust in the sucked air and discharge the air from which the dust is removed. The dust container 11-2 may be provided to separate and store the dust. The dust container 11-2 may be separately coupled to the body 11-1 such that a user may remove the dust inside the dust container 11-2.

The cleaning robot 10 may include the guard portion 12 (or a pressing portion). The guard portion may descend towards the floor surface or ascend in an opposite direction of the floor surface, based on a Z-axis. The guard portion 12 may press the object to be pushed. For example, when the cleaning robot 10 detects the object obstructs the movement of the cleaning robot 10, the cleaning robot 10 may lower the guard portion 12 towards the floor surface and drive towards the object such that the object is pushed by the guard portion 12.

Figure 2:
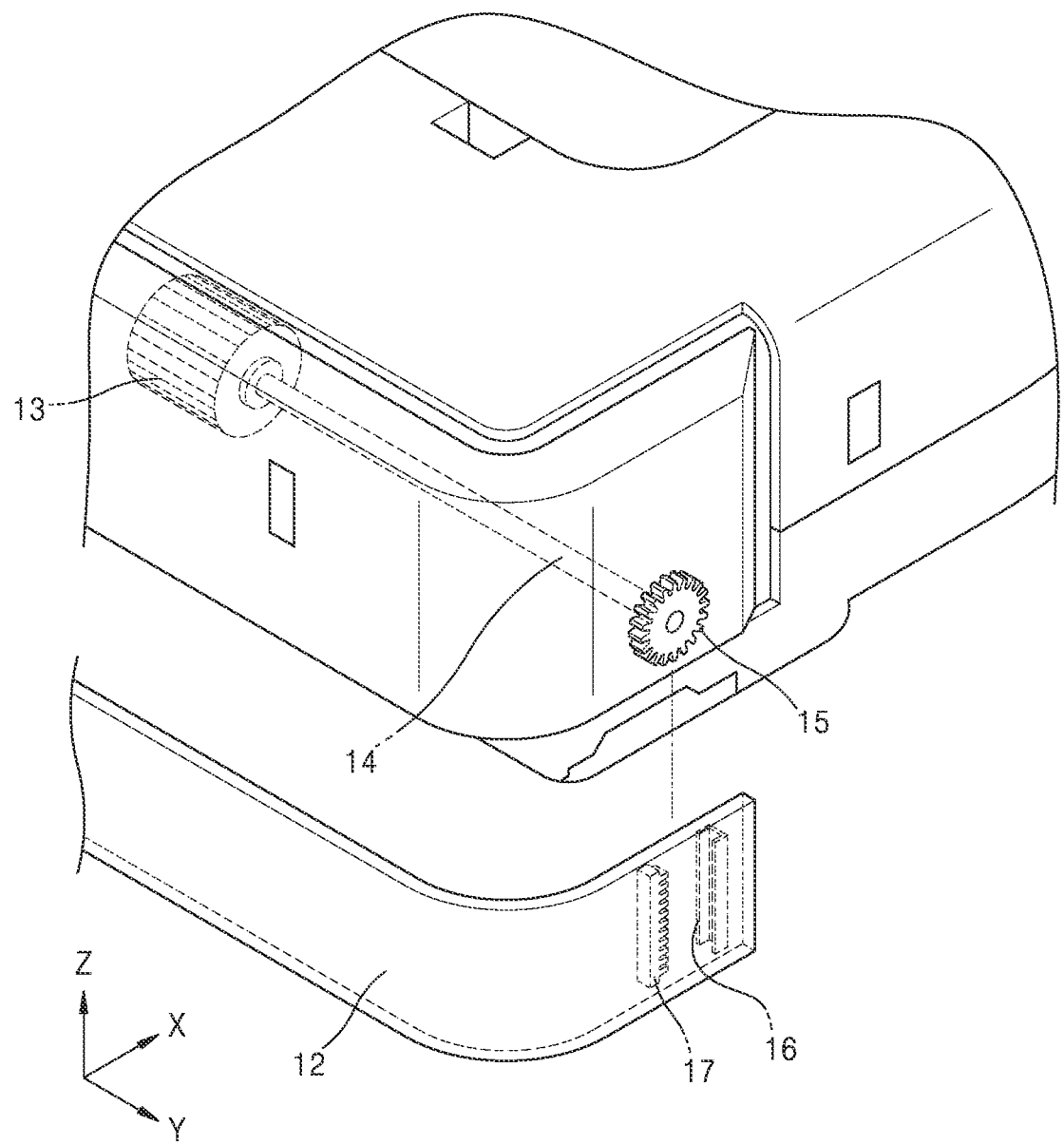
FIG. 2 is a perspective view of a part of an internal configuration of a cleaning robot according to an embodiment of the disclosure.

FIG. 2 is a perspective view of a part of an internal configuration of a cleaning robot according to an embodiment of the disclosure.

Referring to FIG. 2, the cleaning robot 10 may raise or lower the guard portion 12 by controlling power to be transmitted to a driving motor 13.

In this regard, the cleaning robot 10 may include a rotating shaft 14 connecting a pinion gear 15 to the driving motor 13. In addition, the guard portion 12 of the cleaning robot 10 may include a guide portion 16 guiding a moving path of the guard portion 12 along rotation of the pinion gear 15, and a rack gear 17 capable of changing rotation movement transmitted through the rotating shaft 14 to linear movement.

When power is transmitted to the driving motor 13, the rotating shaft 14 may rotate clockwise or counterclockwise, and the pinion gear 15 may rotate according to a rotation force. When the pinion gear 15 rotates in engagement with the rack gear 17, the guide portion 16 may guide the moving path of the guard portion 12 to ascend or descend.

According to an embodiment of the disclosure, one or more power transmitting gears transmitting power may be provided between the driving motor 13 and the pinion gear 15, and the number of rotations, a rotation direction, a rotation speed, and the like of the pinion gear 15 may be controlled according to the number of power transmitting gears or the number of teeth of the power transmitting gear. According to an embodiment of the disclosure, one or more fan belts may be used instead of the rotating shaft 14 or the power transmitting gear.

Figure 3A:
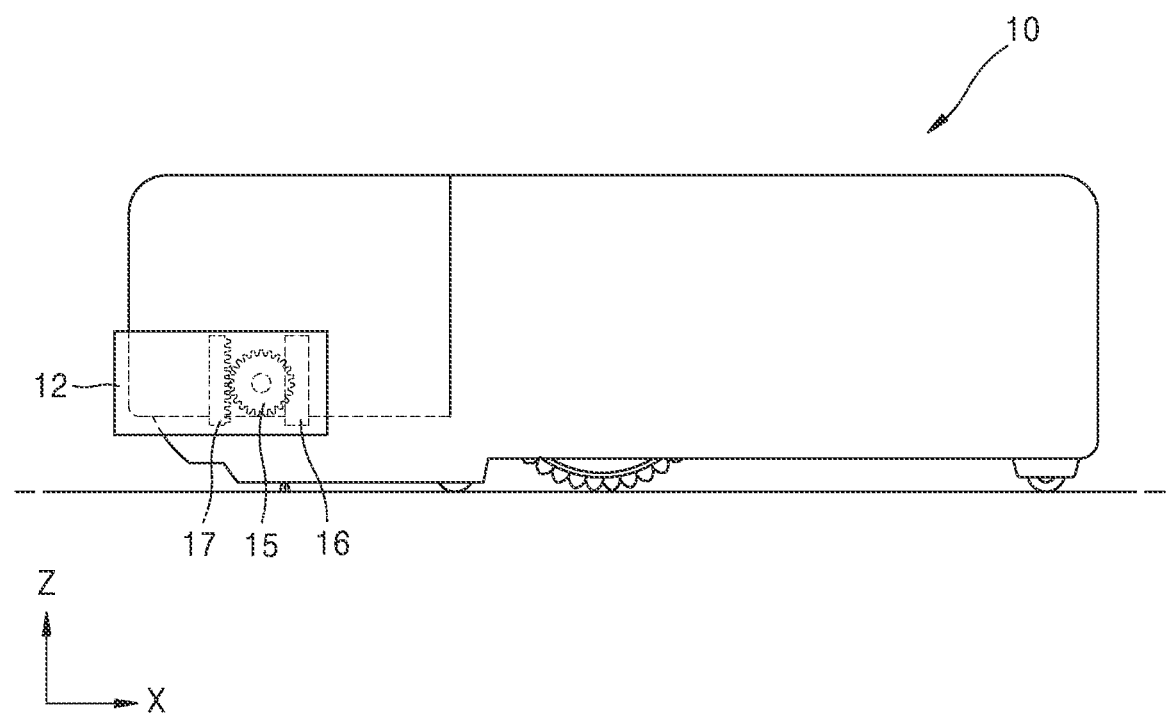
FIG. 3A is a side view of a cleaning robot when a guard portion is ascended according to an embodiment of the disclosure.
Figure 3B:
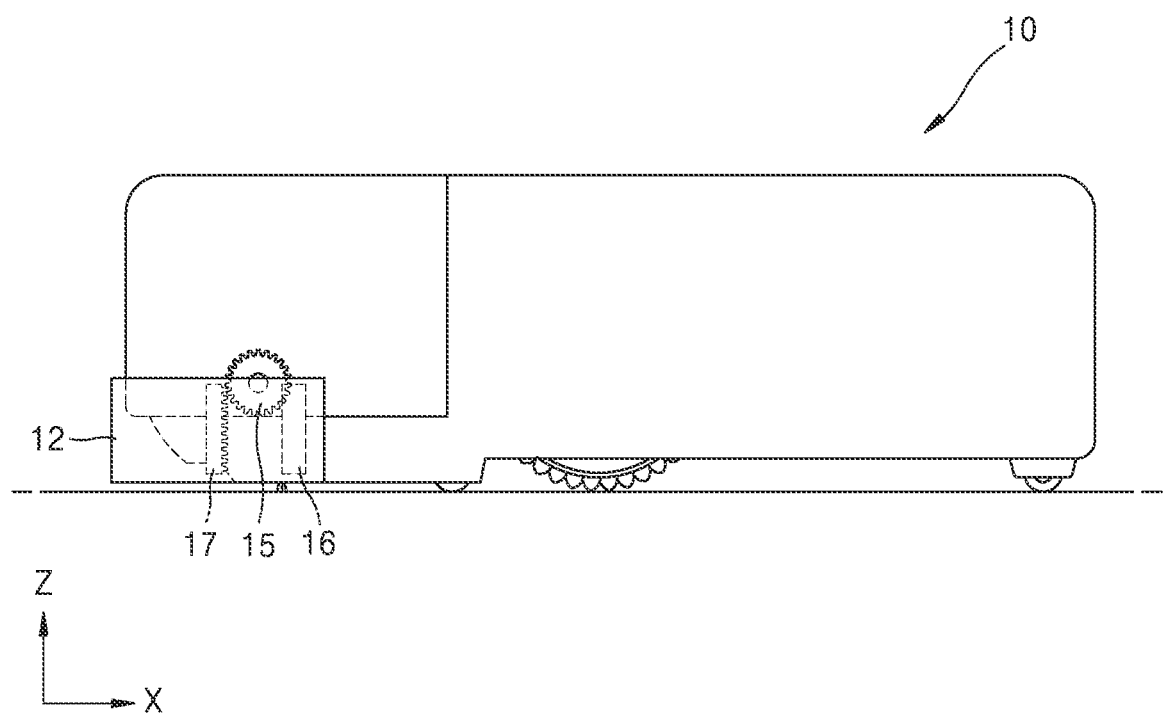
FIG. 3B is a side view of a cleaning robot when a guard portion is descended according to an embodiment of the disclosure.

FIG. 3A is a side view of a cleaning robot when a guard portion is ascended and FIG. 3B is a side view of a cleaning robot when a guard portion is descended according to various embodiments of the disclosure.

Referring to FIGS. 3A and 3B, the guard portion 12 may ascend or descend along a Z-axis. For example, when the pinion gear 15 rotates clockwise, the guard portion 12 may ascend according to linear movement of the guide portion 16 and the rack gear 17 engaged with the pinion gear 15 as shown in FIG. 3A. On the other hand, when the pinion gear 15 rotates counterclockwise, the guard portion 12 may descend according to linear movement of the guide portion 16 and the rack gear 17 engaged with the pinion gear 15 as shown in FIG. 3B.

Figure 4A:
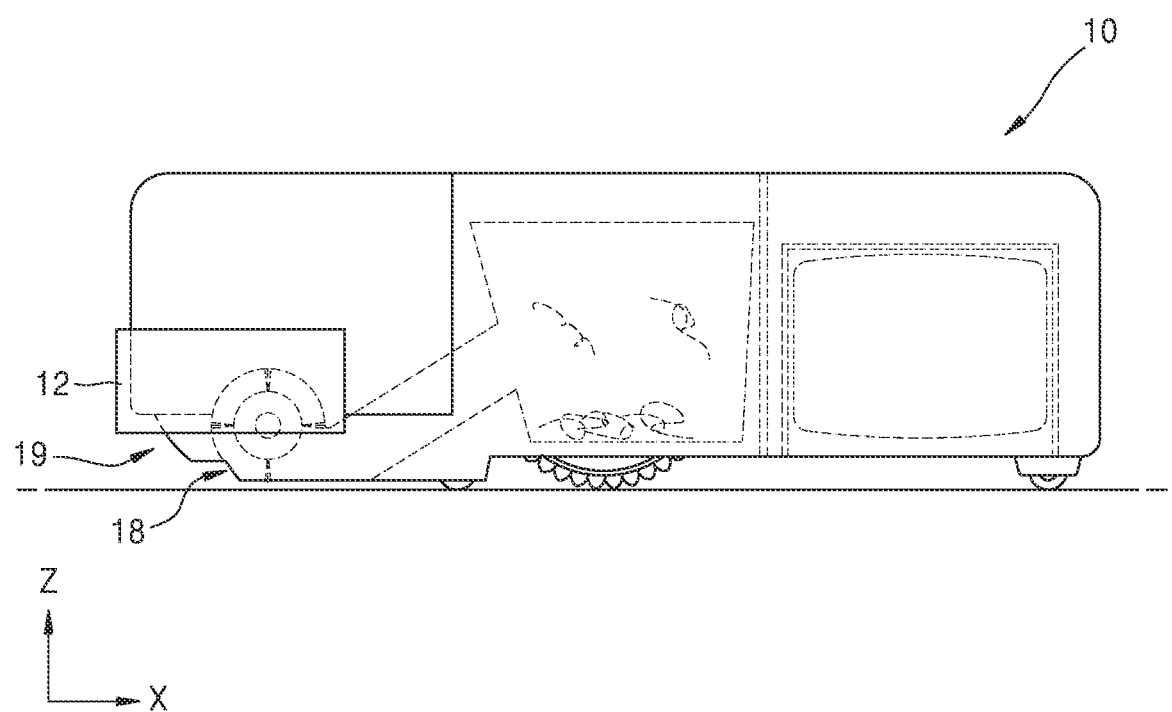
FIG. 4A is an internal side view of a cleaning robot when a guard portion is ascended according to an embodiment of the disclosure.
Figure 4B:
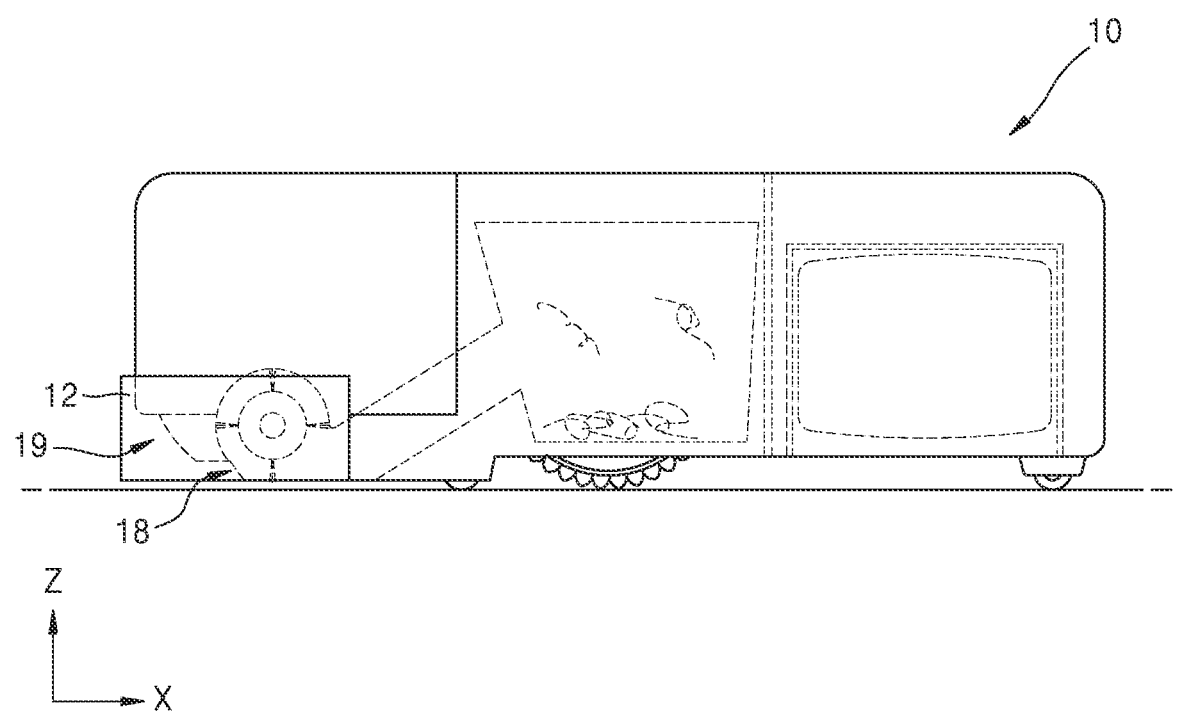
FIG. 4B is an internal side view of a cleaning robot when a guard portion is descended according to an embodiment of the disclosure.

FIG. 4A is an internal side view of a cleaning robot when a guard portion is ascended and FIG. 4B is an internal side view of a cleaning robot when a guard portion is descended.

Referring to FIGS. 4A and 4B, the guard portion 12 may be located in front of an opened portion. The opened portion may include a suction hole 18 or an indented portion 19 located in front of the suction hole 18.

In FIGS. 4A and 4B, the guard portion 12 may move along a Z-axis direction by being located in front of the indented portion 19. In a normal situation, the cleaning robot 10 may move and suck dust of the floor surface while the guard portion 12 is ascended as shown in FIG. 4A. When the cleaning robot 10 needs to push an object while moving, the cleaning robot 10 may lower the guard portion 12 as shown in FIG. 4B and drive towards the object. Here, the cleaning robot 10 may also perform an operation of sucking the dust of the floor surface.

In FIGS. 4A and 4B, the guard portion 12 is located in front of the indented portion 19, but according to an embodiment of the disclosure, the guard portion 12 may be located in front of the suction hole 18. In this case, the cleaning robot 10 may perform an operation of pushing the object when the object has a size lower than a certain height (for example, about 1 cm) corresponding to a suction height or has the center of gravity at a point lower than or equal to the certain height.

Processes of the cleaning robot 10 performing a task by raising or lowering the guard portion 12 according to a surrounding object will be described below.

Figure 5:
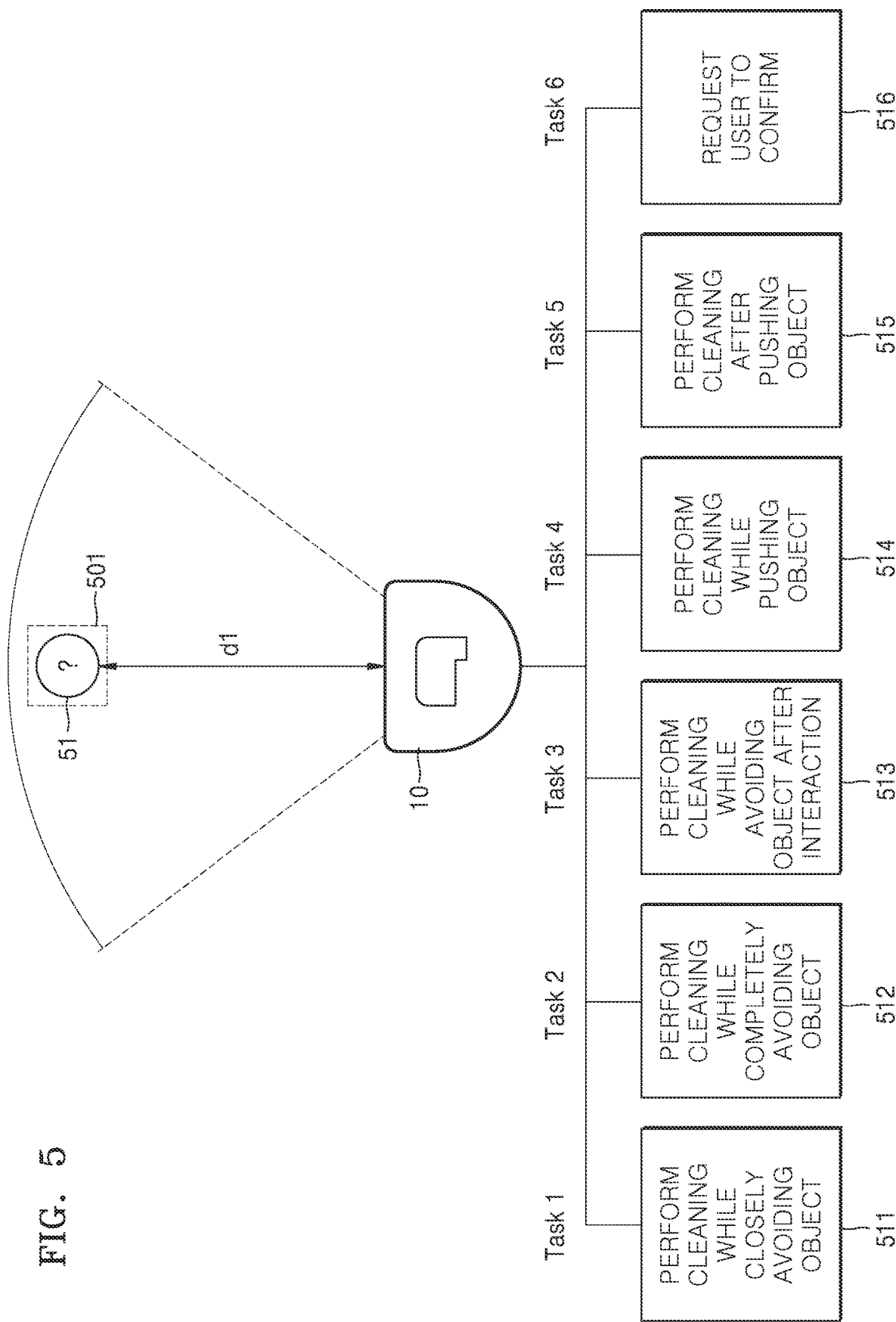
FIG. 5 is a diagram illustrating processes of a cleaning robot determining a task by identifying an object according to an embodiment of the disclosure.

FIG. 5 is a diagram illustrating processes of a cleaning robot determining a task by identifying an object according to an embodiment of the disclosure.

Referring to FIG. 5, the cleaning robot 10 may identify an object 51 nearby. For example, the cleaning robot 10 may capture an image of at least one object 51 through a camera at a certain distance d1 or more (for example, 15 cm or more). The cleaning robot 10 may capture the image of the object 51 before driving starts or capture the image of the object 51 every certain cycle (for example, 0.1 second or 3 cm movement). The cleaning robot 10 may determine a task to be performed by the cleaning robot 10, based on the captured image.

According to an embodiment of the disclosure, the cleaning robot 10 may determine the task to be performed by the cleaning robot 10 by applying the captured image to at least one trained artificial intelligence (AI) model. Here, the cleaning robot 10 may determine a bounding box 501 regarding the object 51 and select an image in the bounding box 501 as the captured image. Then, the cleaning robot 10 may determine the task to be performed by the cleaning robot 10 by applying the image in the bounding box 501 to the at least one trained AI model.

The at least one trained AI model is an AI model configured to determine the task to be performed by the cleaning robot 10, and may be a model trained by using {image including object, task to be performed by cleaning robot} as a training data set.

According to an embodiment of the disclosure, the cleaning robot 10 may obtain identification information of the object 51 by applying the image of the object 51 to a first AI model. The first AI model is an AI model configured to identify an object and may be a model trained by using {image including object, identification information of object} as a training data set. Identification information of an object may include at least one of, for example, a type of the object, a size of the object (for example, a height, width, depth, or the like of the object), or a feature of the object (for example, a color, material, or the like of the object), but is not limited thereto. Upon obtaining the identification information of the object 51, the cleaning robot 10 may determine the task to be performed by the cleaning robot 10 by applying the obtained identification information to a second AI model. The second AI model is an AI model configured to determine the task to be performed by the cleaning robot 10, and may be a model trained by using {identification information of object, task to be performed by cleaning robot} as a training data set.

According to an embodiment of the disclosure, the cleaning robot 10 may obtain identification information of the object 51 by applying the image of the object 51 to the first AI model. The first AI model is an AI model configured to identify an object and may be a model trained by using {image including object, identification information of object} as a training data set. Upon receiving the identification information of the object 51, the cleaning robot 10 may determine the task to be performed by the cleaning robot 10 by applying the identification information of the object 51 to a rule-based model (or a mathematical model). For example, the cleaning robot 10 may store a matching table in which a task to be performed by the cleaning robot 10 is matched to each type of an object. In this case, the cleaning robot 10 may determine the task to be performed by the cleaning robot 10 corresponding to the identification information of the object 51 by using the matching table.

In the above embodiments of the disclosure, the AI model configured to determine the task to be performed by the cleaning robot 10 by using the captured image, the first AI model configured to obtain the identification information of the object 51, and the second AI model configured to determine the task to be performed by the cleaning robot 10 by using the identification information may be included in the cleaning robot 10 or included in an external server (not shown). Such AI models may be trained according to, for example, a supervised learning method based on an AI algorithm or an unsupervised learning method. As an example of an AI model, a neural network model may be configured to include a plurality of network nodes having weights, and the plurality of network nodes may exchange data according to a convolution connection relationship while being located at different depths (or different layers). For example, a deep neural network (DNN), a recurrent neural network (RNN), or a bidirectional recurrent deep neural network (BRDNN) may be used as the neural network model, but is not limited thereto.

According to FIG. 5, types of the task to be performed by the cleaning robot 10 determined based on the captured image of the object 51 include first through sixth tasks 511 through 516, but according to various embodiments of the disclosure, the task of the cleaning robot 10 may be determined from more tasks than those just including the first through sixth tasks 511 through 516 or further subdivided tasks, or from just some of the first through sixth tasks 511 through 516.

The first task 511 may be a task in which the cleaning robot 10 performs cleaning while closely avoiding the object 51.

Close avoidance driving may indicate that the cleaning robot 10 moves in close contact with the object 51 or while maintaining a close distance (or of less than a threshold value, for example, less than 1 cm) from the object 51.

In this case, the object 51 may be fixed at one area or may be difficult to be moved. Examples of such an object 51 include a wall, a couch, a table, or a bed.

Figure 6A:
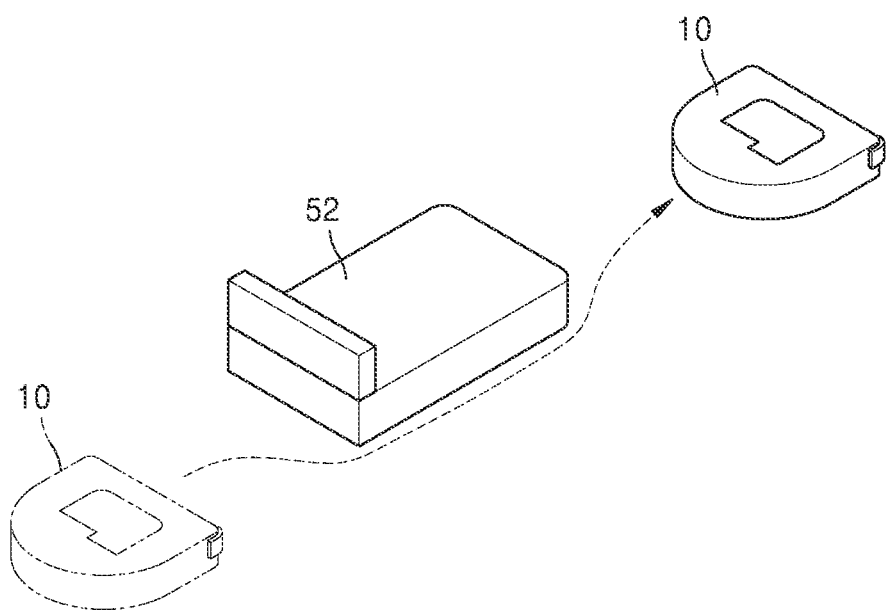
FIG. 6A illustrating processes of a cleaning robot performing a task according to an embodiment of the disclosure.

FIG. 6A illustrates processes of a cleaning robot performing a task of closely avoiding an object according to an embodiment of the disclosure.

Referring to FIG. 6A, the cleaning robot 10 may move in close contact with the object 52 while avoiding the object 52. For example, the cleaning robot 10 may move in close contact with the object 52, based on a 2-dimensional (2D) line included in a navigation map. Alternatively, the cleaning robot 10 may move in close contact with the object 52 while measuring distance information to the object 52 in real time, by using a laser imaging detection and ranging (LIDAR) sensor, an ultrasound sensor, or a position sensitive device (PSD) sensor.

The second task 512 may be a task in which the cleaning robot 10 performs cleaning while completely avoiding the object 51.

Complete avoidance driving may indicate that the cleaning robot 10 moves while avoiding the object 51 by a certain distance (for example, between 1 cm and 15 cm).

In this case, the object 51 may easily break. For example, the object 51 may be a glass cup, a bowl, or a vase. Alternatively, the object 51 may be valuable. For example, the object 51 may be a mobile phone, jewelry, a watch, or glasses. Alternatively, the object 51 may contaminate the cleaning robot 10. For example, the object 51 may be feces of a pet or food.

Figure 6B:
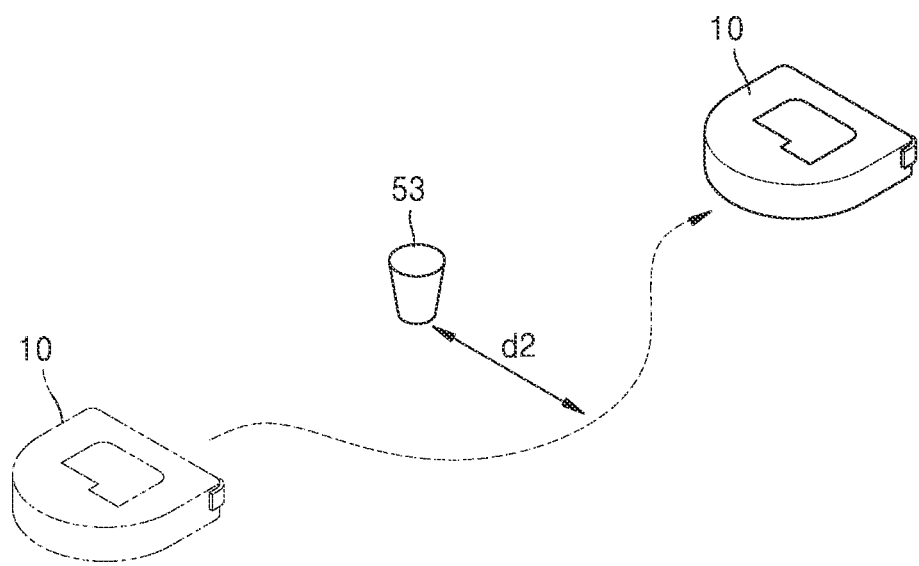
FIG. 6B illustrates processes of a cleaning robot performing a task according to an embodiment of the disclosure.

FIG. 6B illustrates processes of a cleaning robot performing a task of completely avoiding an object according to an embodiment of the disclosure.

Referring to FIG. 6B, the cleaning robot 10 may move while avoiding the object 53 by a certain distance d2 (for example, between 1 cm to 15 cm). At this time, the cleaning robot 10 may decelerate near the object 53 and move while avoiding the object 53. The cleaning robot 10 may obtain distance information to the object 53 and a space where the object 53 is located by using a distance sensor (for example, a depth sensor, a LIDAR sensor, an ultrasound sensor, or an infrared ray (IR) stereo sensor). The cleaning robot 10 may move away from the object 53 by the certain distance d2 while measuring the distance information to the object 53 and the space where the object 53 is located in real time. As another example, the cleaning robot 10 may set a virtual wall around the object 53 by a certain distance. Then, the cleaning robot 10 may move in close contact with the virtual wall in the close avoidance driving manner.

The third task 513 may be a task in which the cleaning robot 10 performs cleaning while avoiding the object 51 after interaction.

In this case, the object 51 may react to the interaction. For example, referring to FIG. 6C, an object 54 may be a while body of a person, a body part of a person, an animal, or a sensing device.

Figure 6C:
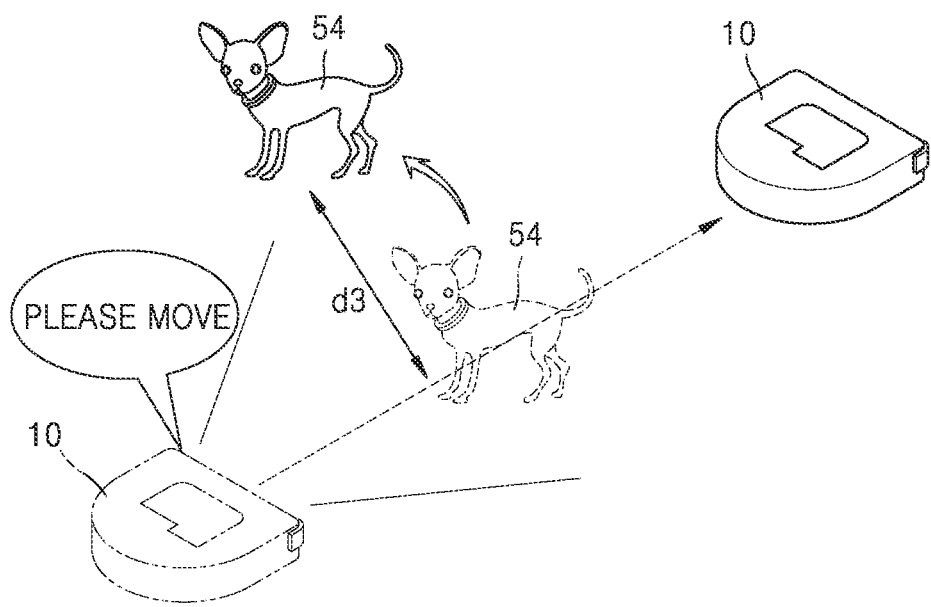
FIG. 6C illustrates processes of a cleaning robot performing a task according to an embodiment of the disclosure.

FIG. 6C illustrates processes of a cleaning robot performing a task of avoiding the object after interaction according to an embodiment of the disclosure.

Referring to FIG. 6C, the cleaning robot 10 may perform interaction towards the object 54. For example, the cleaning robot 10 may output voice of 'Please move'. When the object 54 moves in response to the interaction of the cleaning robot 10, the cleaning robot 10 may obtain distance information to the object 54 and a space where the moved object 54 is located, by using a distance sensor (for example, a depth sensor, a LIDAR sensor, an ultrasound sensor, or an IR stereo sensor). The cleaning robot 10 may move while avoiding the object 54 by a certain distance d3, based on the distance information to the object 54 and the space where the moved object 54 is located.

The fourth task 514 may be a task in which the cleaning robot 10 performs cleaning while pushing the object 51.

In this case, the object 51 may need to be pushed without being sucked by the cleaning robot 10. For example, the object 51 may have a size higher than a certain height (for example, about 1 cm) corresponding to a suction height or have the center of gravity at a point equal to or greater than the certain height. Examples of the object 51 include a box, a doll, or a cushion.

Figure 6D:
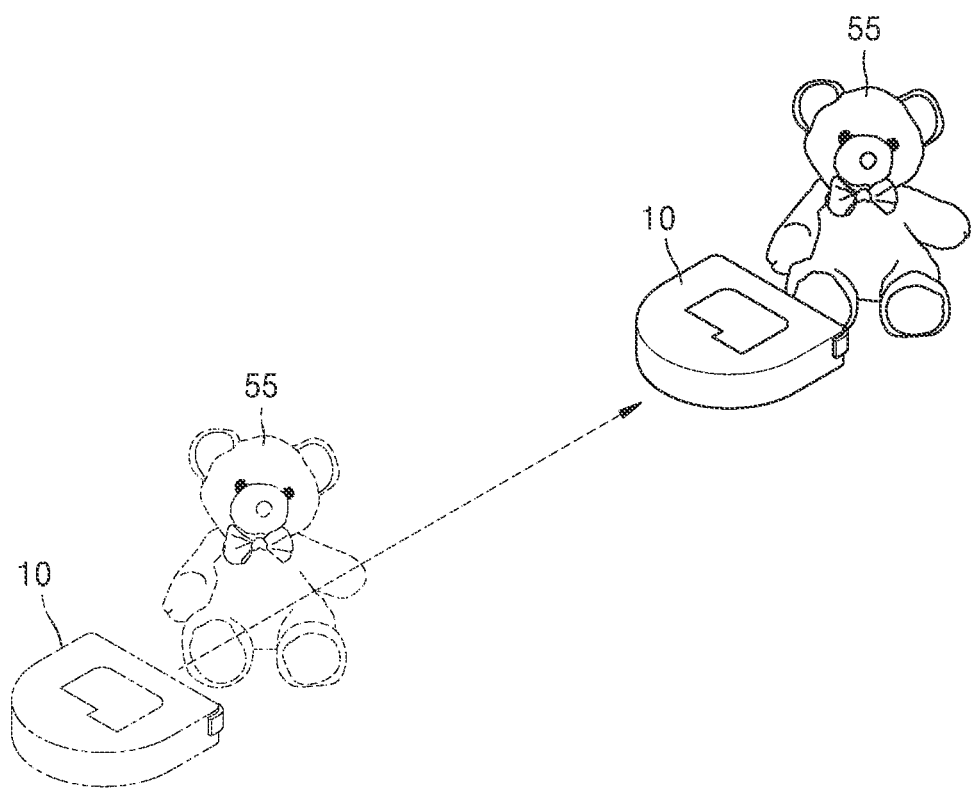
FIG. 6D illustrates processes of a cleaning robot performing a task according to an embodiment of the disclosure.

FIG. 6D illustrates processes of a cleaning robot performing a task of cleaning while pushing (or pressing) an object according to an embodiment of the disclosure.

Referring to FIG. 6D, the cleaning robot 10 may identify the object 55 and move the object 55 in a driving direction. The cleaning robot 10 may clean an area where the object 55 was located. In other words, the cleaning robot 10 may suck dust on a floor surface through a suction hole while moving the object 55. Alternatively, the cleaning robot 10 may clean the floor surface where the object 55 was located after moving the object 55. Meanwhile, after cleaning the floor surface, the cleaning robot 10 may move the object 55 back to its original location. In this case, the cleaning robot 10 may identify the object 55 again and push the object 55 in a direction opposite to a direction the object 55 was previously pushed to move the object 55 back to its original location.

The fifth task 515 may be a task in which the cleaning robot 10 performs cleaning after pushing the object 51.

In this case, the object 51 may get caught while the cleaning robot 10 is moving. For example, the object 51 may be a wire, a sock, or a towel. Alternatively, the object 51 may need to be pushed without being sucked by the cleaning robot 10. For example, the object 51 may be a toy Lego, a note paper, or a pill. At this time, the object 51 may have a size lower than a certain height (for example, about 1 cm) corresponding to the suction height or have the center of gravity at a point lower than or equal to the certain height.

Figure 7A:
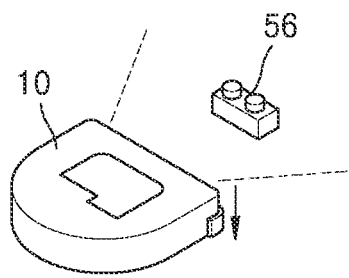
FIG. 7A illustrates processes of a cleaning robot performing a task according to an embodiment of the disclosure.
Figure 7B:
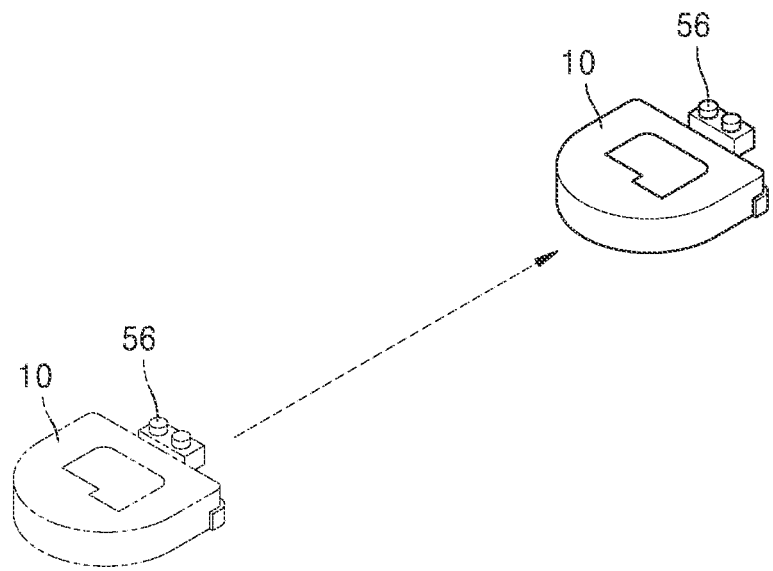
FIG. 7B illustrates processes of a cleaning robot performing a task according to an embodiment of the disclosure.
Figure 7C:
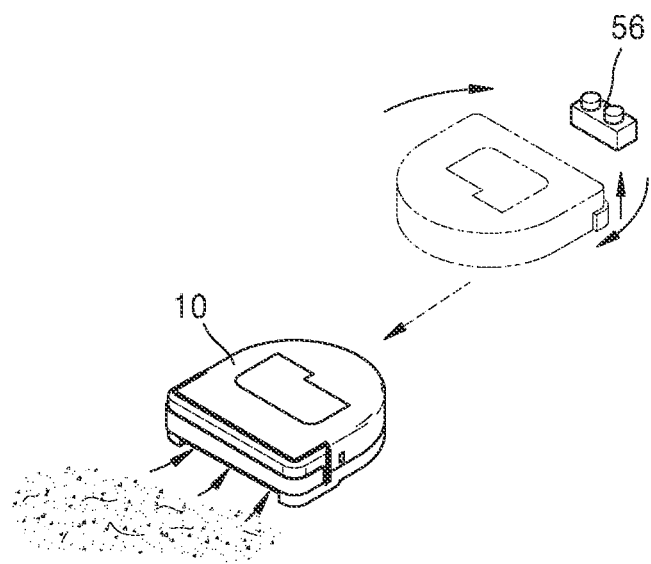
FIG. 7C illustrates processes of a cleaning robot performing a task according to an embodiment of the disclosure.

FIGS. 7A through 7C illustrate processes of a cleaning robot performing a task of cleaning after pushing an object according to various embodiments of the disclosure.

Referring to FIG. 7A, the cleaning robot 10 may identify the object 56 and control the guard portion 12 provided in the cleaning robot 10 to descend. For example, the cleaning robot 10 may control the guard portion 12 to descend to a floor surface as shown in FIGS. 1B, 3B, and 4B.

Referring to FIG. 7B, the cleaning robot 10 may move towards the object 56 such that the object 56 is moved (or pushed) by the guard portion 12. When a designated area to which the object 56 is to be moved is present, the cleaning robot 10 may move the object 56 to the designated area. The designated area may be, for example, an area pre-designated by a user, an area spaced apart from the object 56 by a certain distance, or a wall surface or large structure near the object 56. An example of the cleaning robot 10 determining the designated area will be described below with reference to FIGS. 10 and 11.

Referring to FIG. 7C, after the object 56 is moved, the cleaning robot 10 may control the guard portion 12 to ascend again. Then, the cleaning robot 10 may clean a floor surface where the object 56 was located while the guard portion 12 is ascended. For example, the cleaning robot 10 may clean the floor surface while moving towards the area where the object 56 was located after rotating in a direction opposite to a direction the object 56 was pressed.

Meanwhile, after cleaning the floor surface, the cleaning robot 10 may move the object 56 back to its original location. In this case, the cleaning robot 10 may control the guard portion 12 to descend again and move the object 56 back to its original location by pushing the object 56 in the direction opposite to the direction the object 56 was pushed.

Figure 8A:
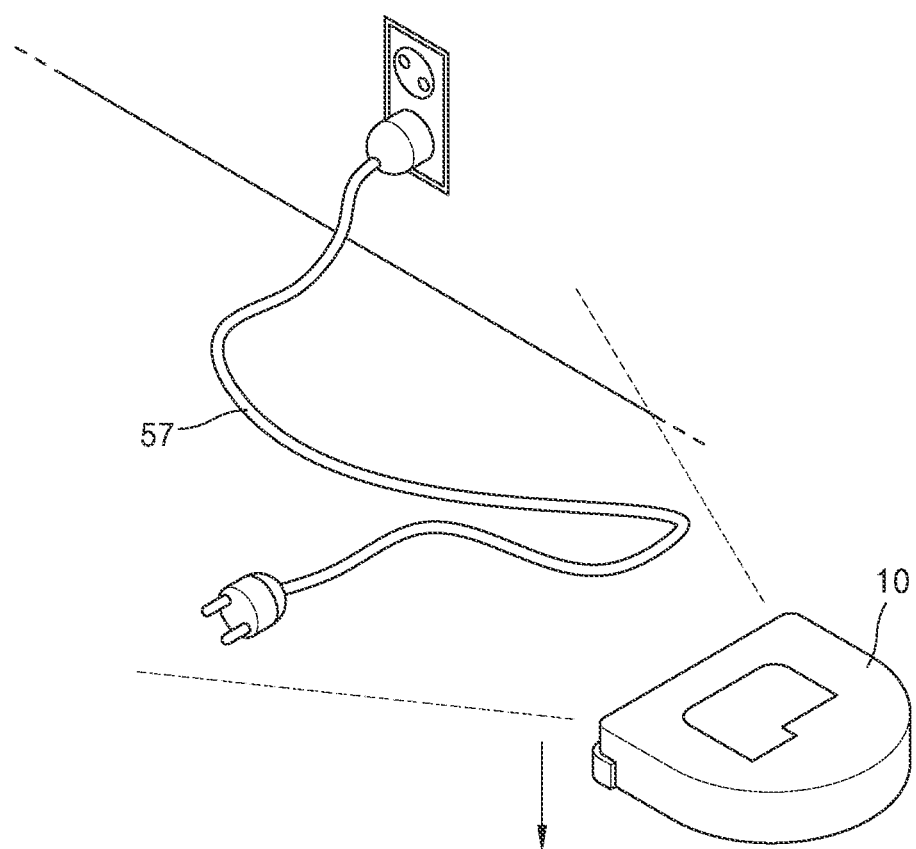
FIG. 8A illustrates processes of a cleaning robot performing a task according to an embodiment of the disclosure.

FIG. 8A illustrates processes of a cleaning robot performing a task according to an embodiment of the disclosure.

Referring to FIG. 8A, the cleaning robot 10 may identify the object 57 and control the guard portion 12 provided in the cleaning robot 10 to descend. Next, the cleaning robot 10 may determine a path for moving the object 57 along. First, the cleaning robot 10 may determine a start location of push driving. For example, the cleaning robot 10 may determine immediately the front of an end portion of the object 57 (for example, an end portion of a wire or a side surface of an object) as the start location by using an image obtained by capturing an image of the object 57 with a camera or by using a distance sensor (for example, a depth sensor, a LIDAR sensor, an ultrasound sensor, or an IR stereo sensor).

Figure 8B:
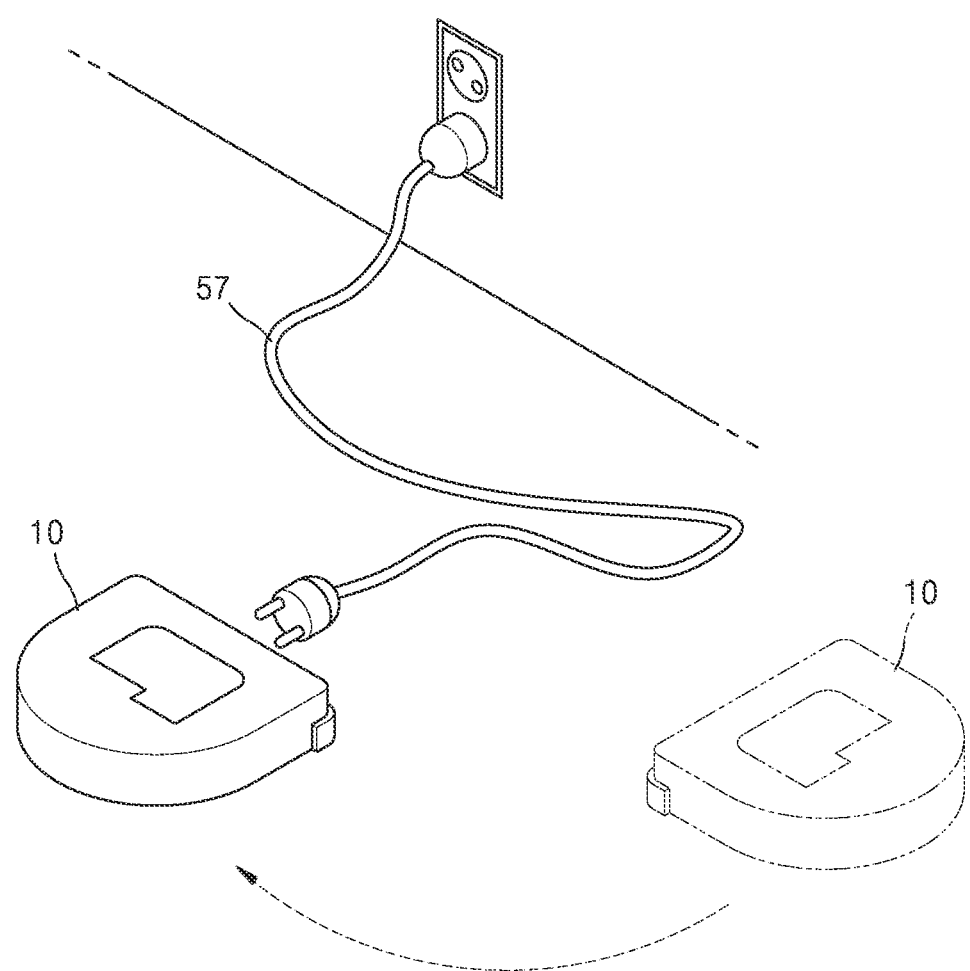
FIG. 8B illustrates processes of a cleaning robot performing a task according to an embodiment of the disclosure.

FIG. 8B illustrates processes of a cleaning robot performing a task according to an embodiment of the disclosure.

Referring to FIG. 8B, when the start location is determined the cleaning robot 10 may move to the start location. Then, the cleaning robot 10 may determine a direction of moving the object 57. For example, the cleaning robot 10 may determine a path for moving the object 57 in a direction not interfering with cleaning (or a direction for securing a cleaning area). For example, the cleaning robot 10 may determine the direction of moving the object 57 such that the size of the object 57 is minimized, the width of the object 57 is minimized, or the object 57 is in close contact with a wall as much as possible.

Figure 8C:
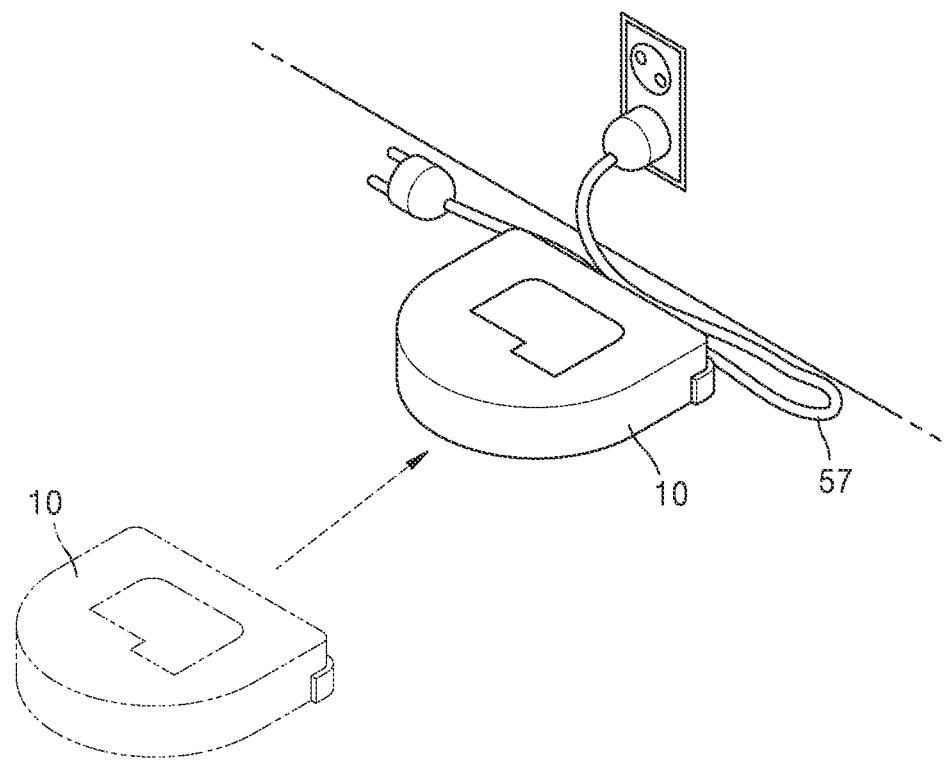
FIG. 8C illustrates processes of a cleaning robot performing a task according to an embodiment of the disclosure.

FIG. 8C illustrates processes of a cleaning robot performing a task according to an embodiment of the disclosure.

Referring to FIG. 8C, when the path for moving the object 57 along is determined, the cleaning robot 10 may move towards the object 57 along the determined path.

Figure 8D:
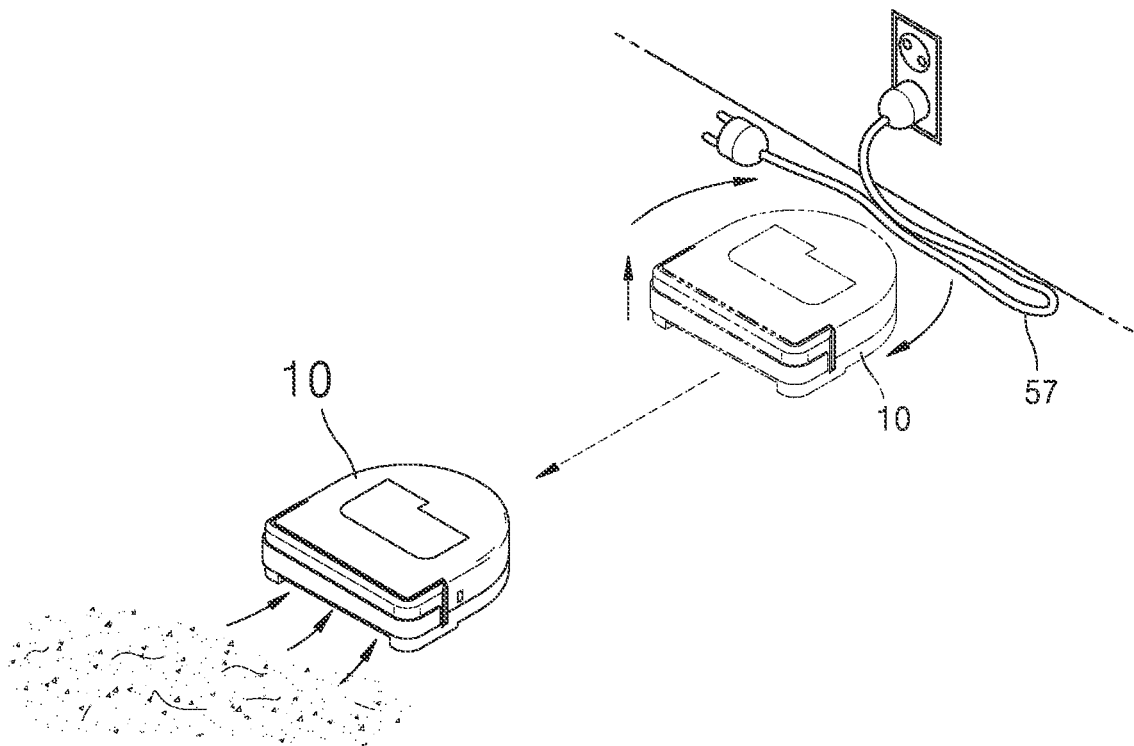
FIG. 8D illustrates processes of a cleaning robot performing a task according to an embodiment of the disclosure.

FIG. 8D illustrates processes of a cleaning robot performing a task according to an embodiment of the disclosure.

Referring to FIG. 8D, when the object 57 is in close contact with the wall, the cleaning robot 10 may raise the guard portion 12 again and clean the floor surface where the object 57 was located while the guard portion 12 is ascended, as shown in FIG. 8D. For example, the cleaning robot 10 may raise the guard portion 12 and clean the floor surface while moving towards the area where the object 57 was located, after rotating in a path opposite to the path along which the object 57 was pushed.

The sixth task 616 may be a task in which the cleaning robot 10 requests a user to confirm.

Figure 9:
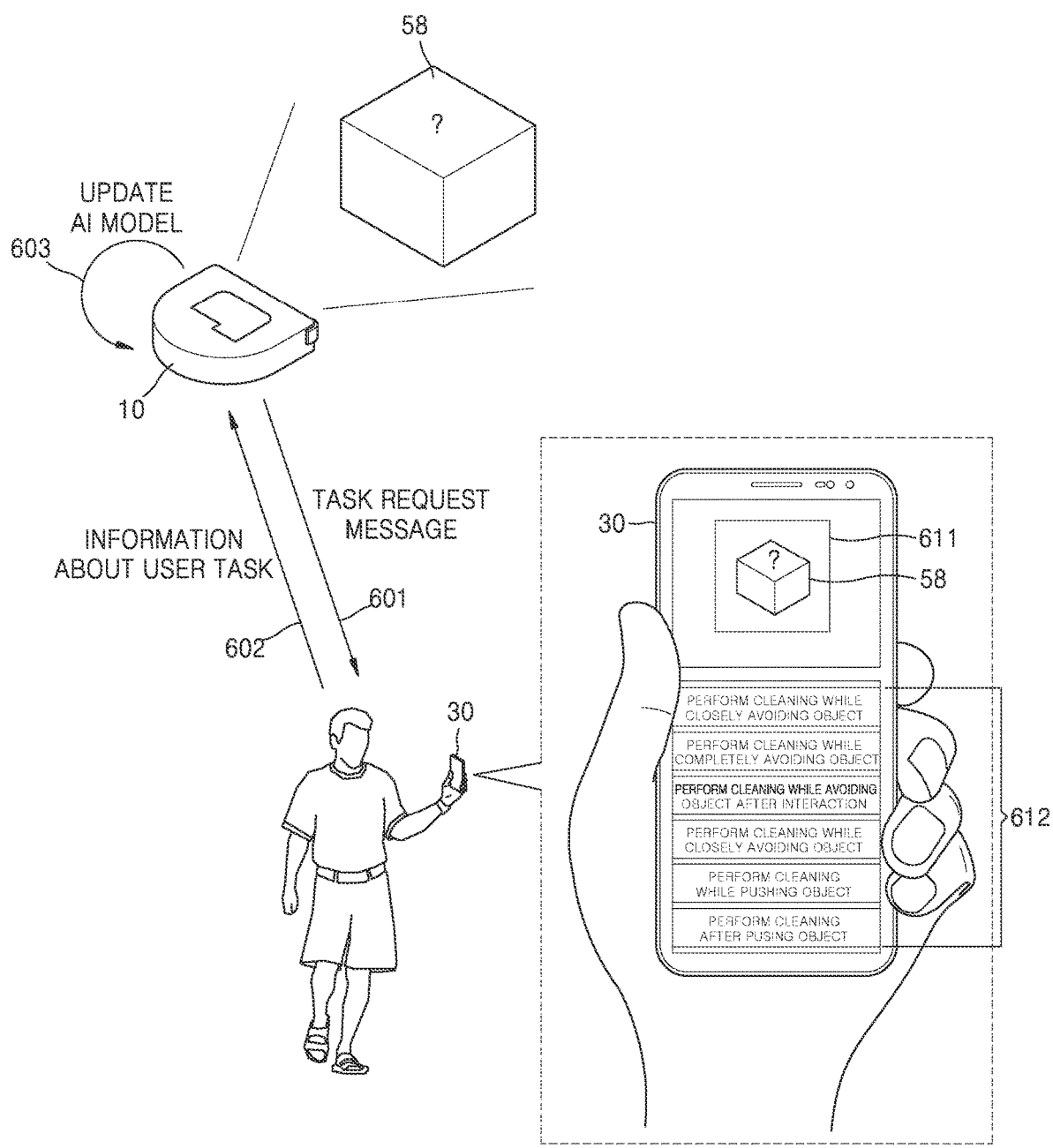
FIG. 9 illustrates processes of a cleaning robot performing a task according to an embodiment of the disclosure.

Here, the cleaning robot 10 may communicate with a user terminal device 30 of FIG. 9 of the user to receive confirmation from the user. The cleaning robot 10 and the user terminal device 30 communicating with each other may denote direct connection via a short range communication technology or communication connection via a third repeater. Examples of the third repeater may include a base station, a hub, an access point, a gateway, a switch, or a relay server.

FIG. 9 illustrates processes of a cleaning robot performing a task according to an embodiment of the disclosure.

Referring to FIG. 9, the cleaning robot 10 may capture an image of an object 58 and apply the captured image to at least one trained AI model. In this case, a task to be performed by the cleaning robot 10 may be unable to be determined, a plurality of tasks may be determined to be performed by the cleaning robot 10, or a confidence value (or a probability value) of a task to be performed by the cleaning robot 10 may be lower than or equal to a certain value. At this time, the cleaning robot 10 may transmit a task request message requesting a task to be performed by the cleaning robot 10 to the user terminal device 30 at operation 601. The task request message may include information about the captured image.

Upon receiving the task request message, the user terminal device 30 may display a screen for receiving confirmation on a task from the user. The screen may include an image 611 including the object 58 captured by the cleaning robot 10 and a list 612 of tasks performable by the cleaning robot 10. The list 612 may include all tasks performable by the cleaning robot 10 or a plurality of tasks having a certain confidence value or higher.

When the user selects one user task from the list 612, the user terminal device 30 may transmit information about the selected user task to the cleaning robot 10 at operation 602. The cleaning robot 10 may determine the user task included in the received information as a task to be performed by the cleaning robot 10. The cleaning robot 10 may perform cleaning according to the determined task.

At operation 603, upon receiving the information about the user task, the cleaning robot 10 may update the at least one AI model configured to determine the task to be performed by the cleaning robot 10, by using the captured image and the received user task as a training data set. Alternatively, when the at least one AI model configured to determine the task to be performed by the cleaning robot 10 is located in a server (not shown), the cleaning robot 10 may transmit the captured image and the user task to the server. The server may update the at least one AI model configured to determine the task to be performed by the cleaning robot 10, by using the received captured image and user task as the training data set.

Thereafter, the cleaning robot 10 may apply the captured image to the updated at least one AI model to determine the task to be performed by the cleaning robot 10. For example, when an object of the same or similar shape as the object 58 of FIG. 9 is identified, the cleaning robot 10 may perform cleaning based on the task that was determined by the user for the object 58.

According to an embodiment of the disclosure, even when a task of the cleaning robot 10, which corresponds to an image obtained by capturing an image of an object, is pre-determined, the cleaning robot 10 may transmit the captured image to the user terminal device 30 to notify the user. For example, when the object is determined to cause danger, to break, or to become a contaminant when continuously neglected, the cleaning robot 10 may provide the captured image to the user terminal device 30. The user may personally handle the object or provide a command to the cleaning robot 10 through the user terminal device 30 to avoid the object or move the object, based on the captured image.

According to an embodiment of the disclosure, the cleaning robot 10 may determine a task to be performed by the cleaning robot 10 by using not only information about capturing an object, but also sensing information detected by at least one sensor (for example, a LIDAR sensor, an ultrasound sensor, an IR stereo sensor, or a PSD sensor). For example, the cleaning robot 10 may determine the task to be performed by the cleaning robot 10 by applying the information about capturing the object and the sensing information to at least one AI model. Alternatively, the cleaning robot 10 may determine a location of starting push driving of an object, a path for moving the object along, and a location of ending the push driving, by using at least one of information about capturing the object, information about capturing surroundings of the object, information about detecting the object, or information about detecting the surroundings of the object.

Figure 10:
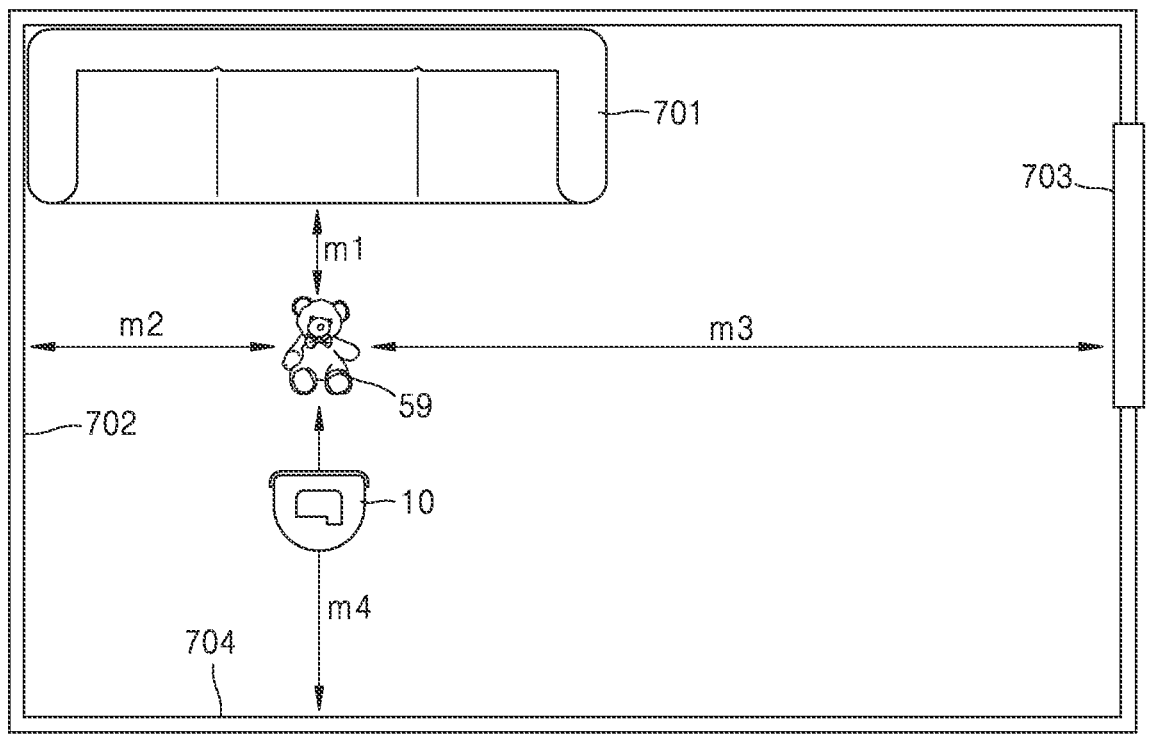
FIG. 10 is a diagram illustrating processes of determining a designated area to which an object is to be moved according to an embodiment of the disclosure.
Figure 11:
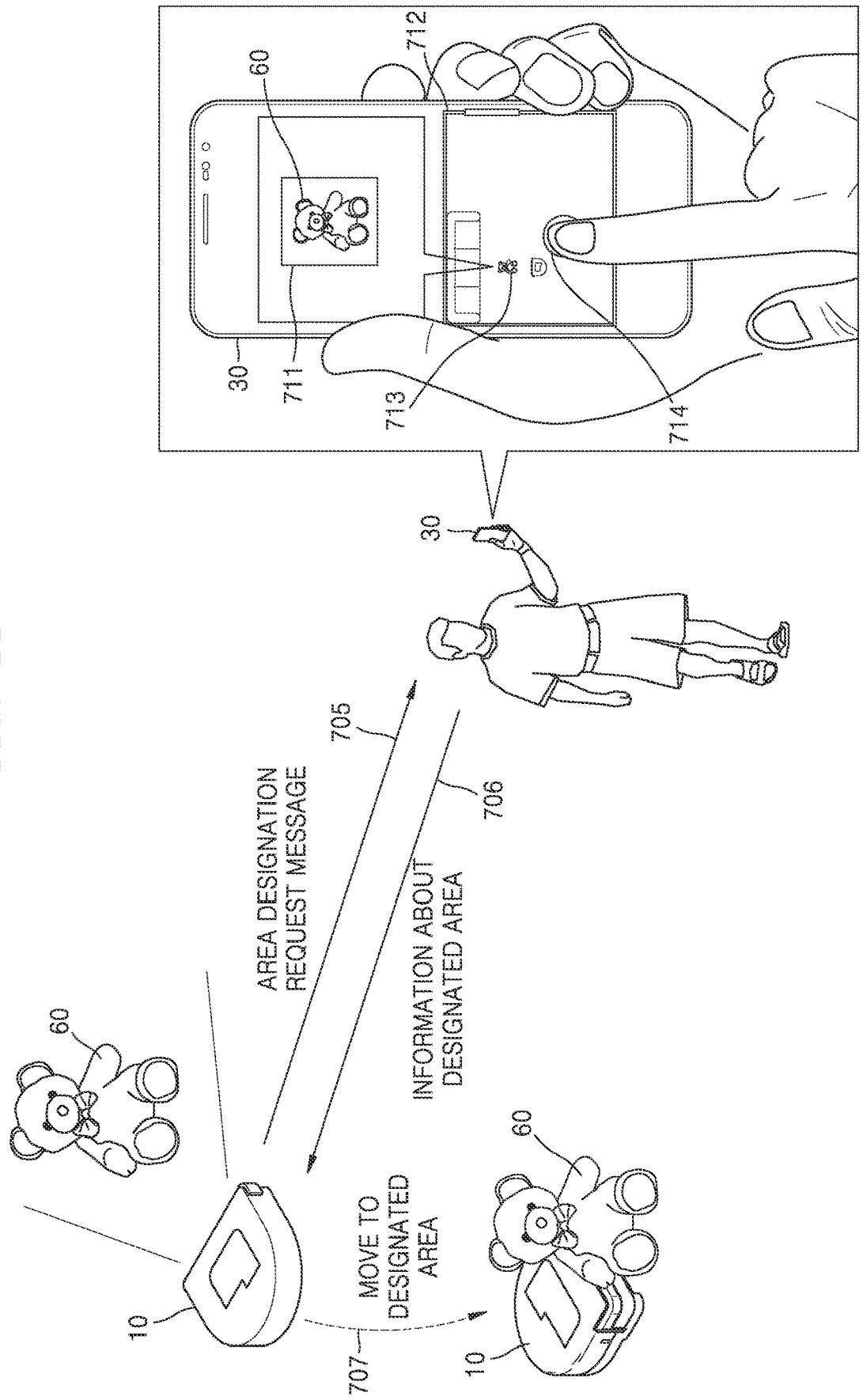
FIG. 11 is a diagram illustrating processes of determining a designated area to which an object is to be moved according to an embodiment of the disclosure.

FIGS. 10 and 11 are diagrams illustrating processes of determining designated areas to which objects are to be moved according to various embodiments of the disclosure.

Referring to FIG. 10, the cleaning robot 10 may capture an image of the object 59 and determine a task to be performed by the cleaning robot 10 according to the captured image. When the task to be performed by the cleaning robot 10 includes an operation of moving the object 59 like the fourth task 514 or the fifth task 515 of FIG. 5, the cleaning robot 10 may designate an area where the object 59 is to be moved.

For example, the cleaning robot 10 may identify a surrounding environment of the object 59 by using a camera or a distance sensor (for example, a depth sensor, a LIDAR sensor, an ultrasound sensor, or an IR stereo sensor). By identifying the surrounding environment of the object 59, the cleaning robot 10 may obtain distance information from the object 59 to each structure (for example, a large structure, such as a wall surface, a door, or a couch). Alternatively, the cleaning robot 10 may identify a structure near the object 59 by using a navigation map stored in the cleaning robot 10 and obtain the distance information from the object 59 to each structure.

For example, the cleaning robot 10 may obtain shortest distance information from the object 59 to structures located in upper, lower, left, and right directions. More particularly, the cleaning robot 10 may obtain distance information m1 from the object 59 to a couch 701 located in the upper direction, distance information from m2 the object 59 to a wall surface 702 located in the left direction, distance information m3 from the object 59 to a door 703 located in the right direction, and distance information m4 from the object 59 to a wall surface 704 located in the lower direction.

The cleaning robot 10 may determine a structure closest to the object 59 based on the obtained distance information. In FIG. 10, the cleaning robot 10 may select the couch 701 as a structure closest to the object 59. When the closest structure is determined, the cleaning robot 10 may move the object 59 to the front of the couch 701.

Referring to FIG. 11, a user may directly indicate a designated area where the object 60 is to be moved.

In FIG. 11, the cleaning robot 10 may transmit, to the user terminal device 30, an area designation request message requesting the user to designate the area where the object 60 is to be moved at operation 705. The area designation request message may include information about an image obtained by capturing the object 60 and information about a map. The information about the map may include, for example, information about a navigation map stored in the cleaning robot 10 or information about a semantic map.

Upon receiving the area designation request message, the user terminal device 30 may display a screen for receiving area designation from the user. The screen may display an image 711 including the object 60 captured by the cleaning robot 10, a map 712 showing at least a part of the inside of a house including an area where the object 60 is located, and a location 713 of the object 60 on the map 712.

Here, when a user input of designating one area 714 on the map 712 is received, the user terminal device 30 may transmit information about the designated area 714 to the cleaning robot 10 at operation 706. The cleaning robot 10 may move the object 60 to the area 714 designated by the user, based on the information about the designated area 714 received from the user terminal device 30 at operation 707.

Figure 12A:
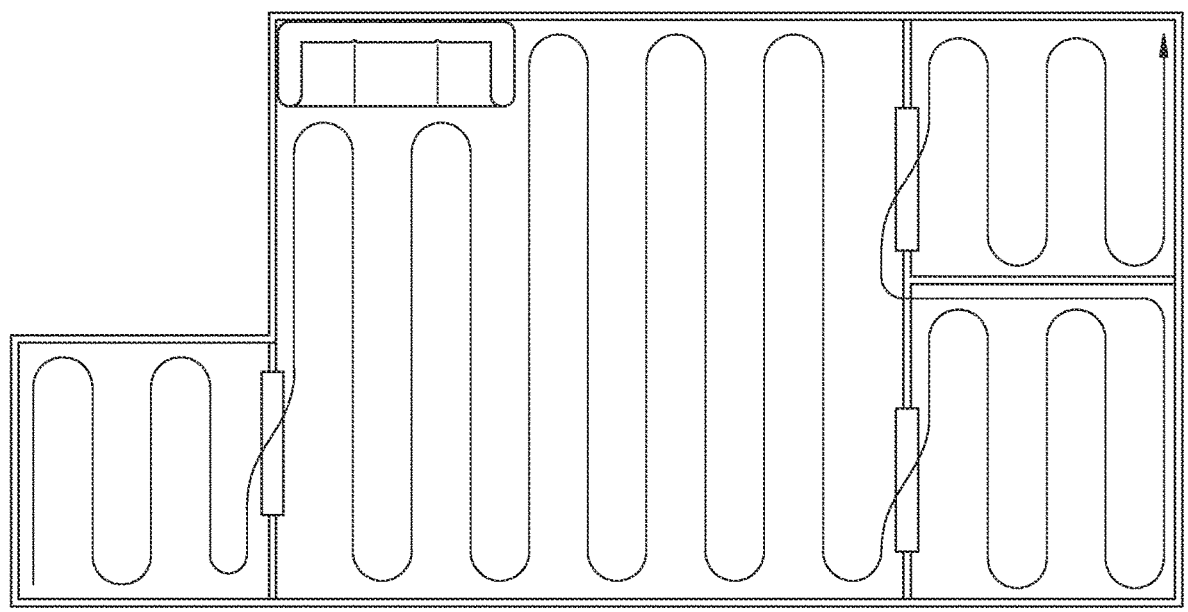
FIG. 12A is a diagram illustrating processes of updating a driving plan of a cleaning robot according to an embodiment of the disclosure.
Figure 12B:
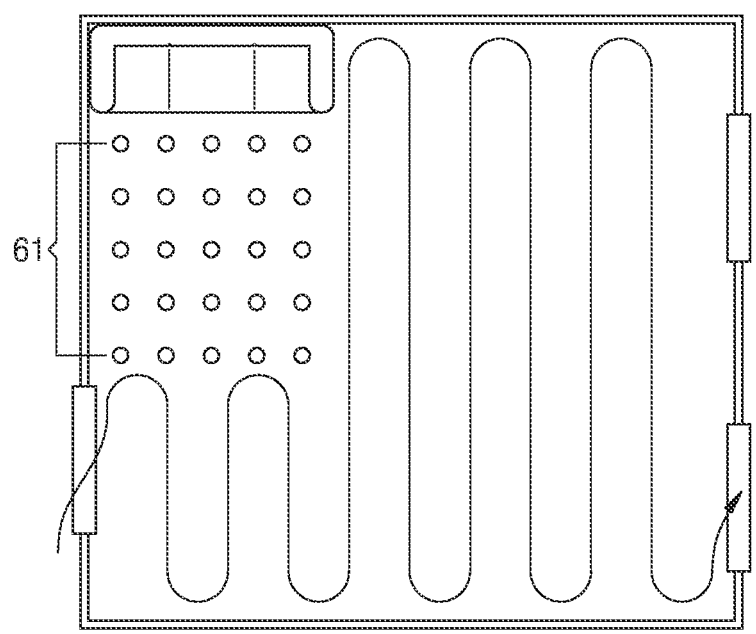
FIG. 12B is a diagram illustrating processes of updating a driving plan of a cleaning robot according to an embodiment of the disclosure.
Figure 12C:
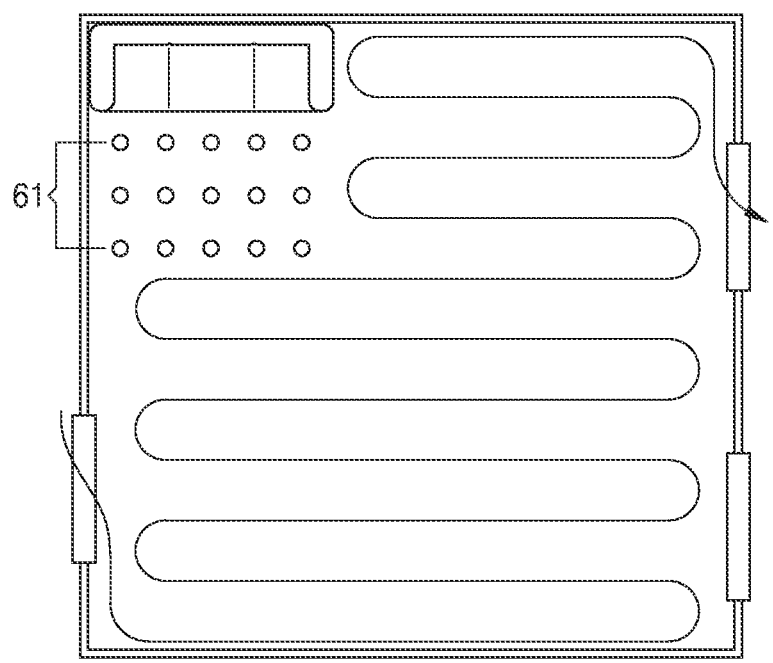
FIG. 12C is a diagram illustrating processes of updating a driving plan of a cleaning robot according to an embodiment of the disclosure.

FIGS. 12A through 12C are diagrams illustrating processes of updating a driving plan of a cleaning robot according to various embodiments of the disclosure.

Referring to FIG. 12A, the cleaning robot 10 may set a global driving plan for planning a driving path for performing a task for the inside of a house.

Referring to FIGS. 12B and 12C, the cleaning robot 10 may set a local driving plane for planning a driving path for performing a task for each area inside the house.

The global driving plan or the local driving plan may be planned such that, for example, the number of rotations (or turns) or a moving distance of the cleaning robot 10 is minimized. For example, the cleaning robot 10 may compare a horizontal length and a vertical length of a driving direction and set a driving plan to move in a longer direction first.

According to an embodiment of the disclosure, as shown in FIG. 12B, the cleaning robot 10 may set and store the local driving plan for one area inside the house, in a situation where objects 61 are present.

In this situation, the cleaning robot 10 may perform a task of moving the objects 61. For example, a task of moving an object like the fourth task 514 or the fifth task 515 of FIG. 5 described above may be performed.

When locations of the objects 61 are changed as the objects 61 are pushed, the cleaning robot 10 may update the local driving plan. For example, the cleaning robot 10 may compare the numbers of rotations or the moving distances of the cleaning robot 10 when the vertical length is driven first and the horizontal length is driven first, and update the local driving plan such that the number of rotations or the moving distance of the cleaning robot 10 is minimized.

For example, the cleaning robot 10 may set the local driving plan to move the vertical length first before the locations of the objects 61 are changed, but after the locations of the objects 61 are changed, the cleaning robot 10 may set the local driving plan to move the horizontal length first as shown in FIG. 12C.

FIG. 10 is a block diagram of a configuration of a cleaning robot according to an embodiment of the disclosure.

Figure 13A:
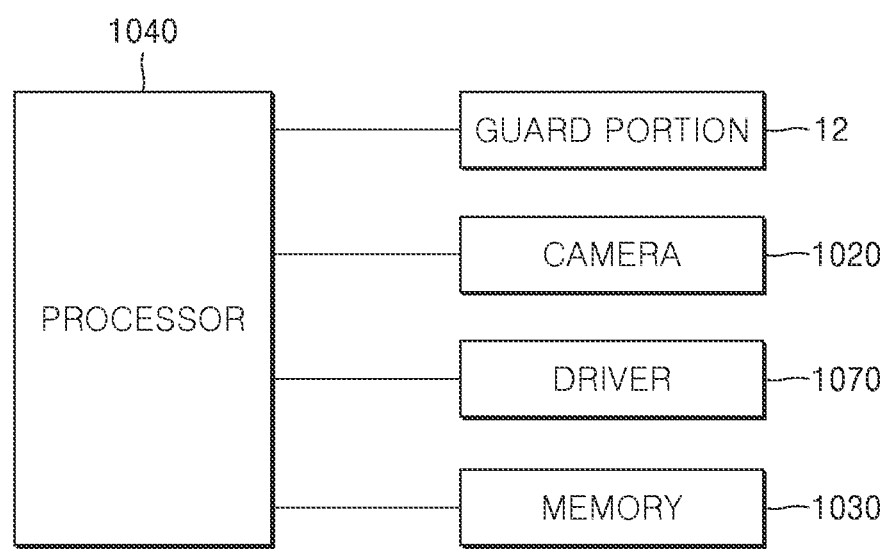
FIG. 13A is a simple block diagram of a configuration of a cleaning robot according to an embodiment of the disclosure.

FIG. 13A is a block diagram of a configuration of a cleaning robot according to an embodiment of the disclosure.

Figure 13B:
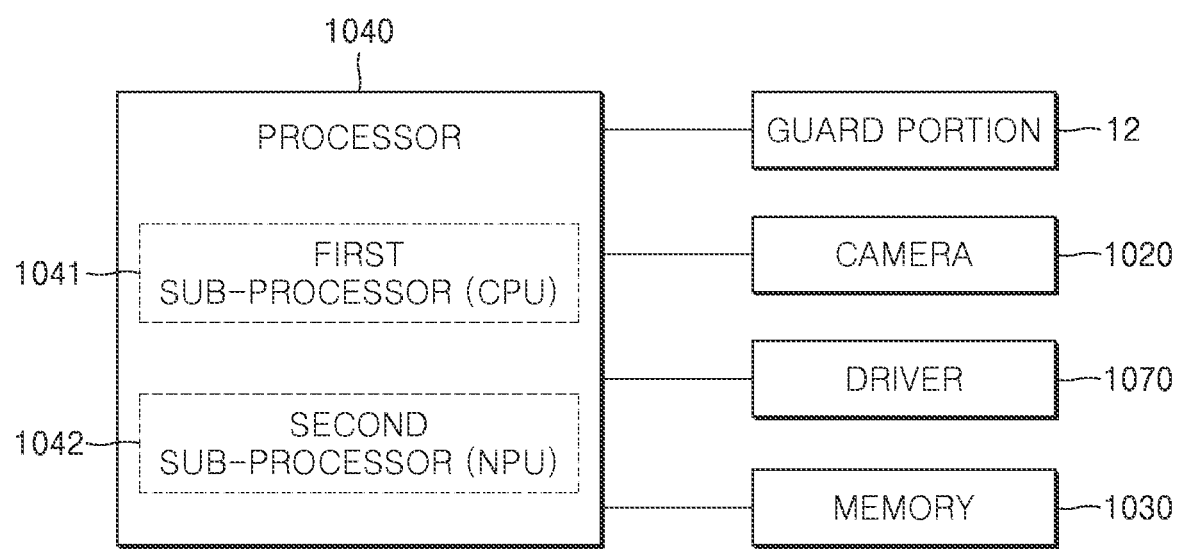
FIG. 13B is a simple block diagram of a configuration of a cleaning robot according to an embodiment of the disclosure.

FIG. 13B is a block diagram of a configuration of a cleaning robot according to an embodiment of the disclosure.

Referring to FIGS. 13A and 13B, the cleaning robot 10 may include the guard portion 12, a camera 1020, a memory 1030, a processor 1040, and a driver 1070.

Because the configuration and operations of the guard portion 12 have been described with reference to FIGS. 1A through 4B, redundant descriptions are not provided again.

The camera 1020 may capture surrounding images of the camera 1020 in various directions. More particularly, the camera 1020 may capture a front image of the cleaning robot 10 or capture an image in a direction different from a driving direction, through an RGB camera. The camera 1020 may be provided independently from the cleaning robot 10 or may be included in an object recognition sensor as a part of the object recognition sensor.

The camera 1020 may include a plurality of cameras. More particularly, the camera 1020 may be provided both at the top and the front of the cleaning robot 10 or may be provided only at at least one of the top or the front.

The memory 1030 may store an image captured by the camera 1020 and moving state information and photographing direction information of the cleaning robot 10 at the time of photographing. In addition, the memory 1030 may store information about a map of a place where the cleaning robot 10 performs a task. The information about the map may include, for example, information about a navigation map or a semantic map.

For example, the cleaning robot 10 may detect a task area by using at least one of an IR stereo sensor, an ultrasound sensor, a LIDAR sensor, a PSD sensor, or an image sensor. The cleaning robot 10 may generate the navigation map for driving by using a result of detecting the task area. For example, the cleaning robot 10 may generate a 2D navigation map by using the LIDAR sensor. The navigation map may include, for example, areas inside the house defined by one or more 2D lines.

As another example, the cleaning robot 10 may obtain identification information of an object by using a result of capturing an image of an object or detecting the object. The cleaning robot 10 may obtain, as the identification information of the object, a name of the object, a type of the object, or an attribute of the object. The cleaning robot 10 may generate the semantic map indicating an environment of the task area where the cleaning robot 10 performs a task, by mapping the identification information of the object and an area of the object included in the navigation map. The identification information of the object may be displayed at an area of the semantic map where the object is located, in text (for example, the name of the object) or an icon. Alternatively, the identification information of the object may be displayed at the area of the semantic map where the object is located, in a reference form. More particularly, the identification information of the object may be displayed with respect to an indication line indicating the area where the object is located or the identification information of the object may be displayed with respect to a distinguished color after distinguishing the area of the object with a color. In the semantic map, the identification information of the object may be displayed, for example, with at least one of a 3D map on which a structure of the task area is reflected or the navigation map (for example, a LIDAR map) as a background.

As another example, the cleaning robot 10 may obtain identification information of each place of the task area by using a result of detecting the task area. The cleaning robot 10 may obtain a name of the place as the identification information of the place. For example, the cleaning robot 10 may identify an area with the most doors and the widest area as a living room and identify an area having the next widest area as a bed room. The cleaning robot 10 may obtain the identification information of each place of the task area by using the identification information of the object located at each place of the task area. For example, the cleaning robot 10 may determine an area where a dining table is identified as a kitchen, an area where a bed is identified as a bed room, and an area where a television (TV) or a couch is identified as a living room. Once the identification information of each place is obtained, the cleaning robot 10 may generate the semantic map indicating the environment of the task area by using the navigation map and the obtained identification information of each place.

The memory 1030 may store a plurality of application programs (or applications) driven by the cleaning robot 10, and data and instructions for operating the cleaning robot 10. At least some of the application programs may be downloaded from an external server via wireless communication. In addition, at least some of the application programs may be present in the cleaning robot 10 at the time of release for basic functions of the cleaning robot 10. The application program may be stored in the memory and driven to perform an operation (or a function) of the cleaning robot 10 by the processor 1040.

The memory 1030 may be implemented as a nonvolatile memory, a volatile memory, a flash memory, a hard disk drive (HDD), or a solid state drive (SSD). The memory 1030 is accessed by the processor 1040 and data may be read/written/modified/deleted/refined by the processor 1040. In the disclosure, the term 'memory' may include the memory 1030, a read-only memory (ROM) (not shown) or a random access memory (RAM) (not shown) in the processor 1040, or a memory card (not shown (for example, a micro secure digital (SD) card or a memory stick) provided in the cleaning robot 10.

According to an embodiment of the disclosure, the memory 1030 may store at least one instruction set such that the processor 1040 controls the cleaning robot 10 to capture an image of an object in the vicinity of the cleaning robot 10, determine a task to be performed by the cleaning robot 10 by applying the captured image to at least one trained AI model, control the guard portion 12 to descend from the front of the opened portion of the cleaning robot 10 to a floor surface according to the determined task, and drive towards the object such that the object is moved by the descended guard portion 12.

The processor 1040 may control overall operations of the cleaning robot 10. For example, the processor 1040 may control the camera 1020 to capture an image in the vicinity of the cleaning robot 10. In addition, the processor 1040 may include a central processing unit (CPU), RAM, ROM, and a system bus. The ROM stores an instruction set for system booting and the CPU may copy, to the RAM, an operating system (OS) stored in the memory 1030 of the cleaning robot 10 according to an instruction stored in the ROM and boot a system by executing the OS. When the booting is completed, the CPU may copy various applications stored in the memory 1030 to the RAM and execute the various applications to perform various operations.

According to an embodiment of the disclosure, as shown in FIG. 13B, the processor 1040 may include a plurality of sub-processors. The plurality of sub-processors may include a CPU 1041 and a neural processing unit (NPU) 1042. The NPU 1042 may be a dedicated processor optimized to identify an object by using a trained AI model. In addition, the processor 1040 may include at least one of a digital signal processor (DSP) processing a digital signal, a microprocessor, a time controller (TCON), a micro-controller unit (MCU), a micro-processing unit (MPU), an application processor (AP), a communication processor (CP), or an advanced reduced instruction set computer (RISC) machines (ARM) processor, and may be defined by the respective term used. The processor 1040 may be implemented as a system on chip (SoC) in which a processing algorithm is embedded, a large scale integration (LSI), or a field programmable gate array (FPGA).

According to an embodiment of the disclosure, the processor 1040 may control the camera 1020 to capture an image of an object in the vicinity of the cleaning robot 10. The processor 1040 may determine a task to be performed by the cleaning robot 10 by applying the captured image to at least one trained AI model. The processor 1040 may control the driver 1070 to lower the guard portion 12 from the front of the opened portion to the floor surface, according to the determined task. When the guard portion 12 is descended, the processor 1040 may control the driver 1070 to drive towards the object such that the object is moved by the descended guard portion 12.

According to an embodiment of the disclosure, the processor 1040 may determine a path for moving the object along and control the driver 1070 such that the cleaning robot 10 moves towards the object along the determined path.

According to an embodiment of the disclosure, the processor 1040 may control the guard portion 12 to ascend after the object is moved. Then, the processor 1040 may control the driver 1070 to drive on the floor surface where the object was located before being moved.

Figure 14:
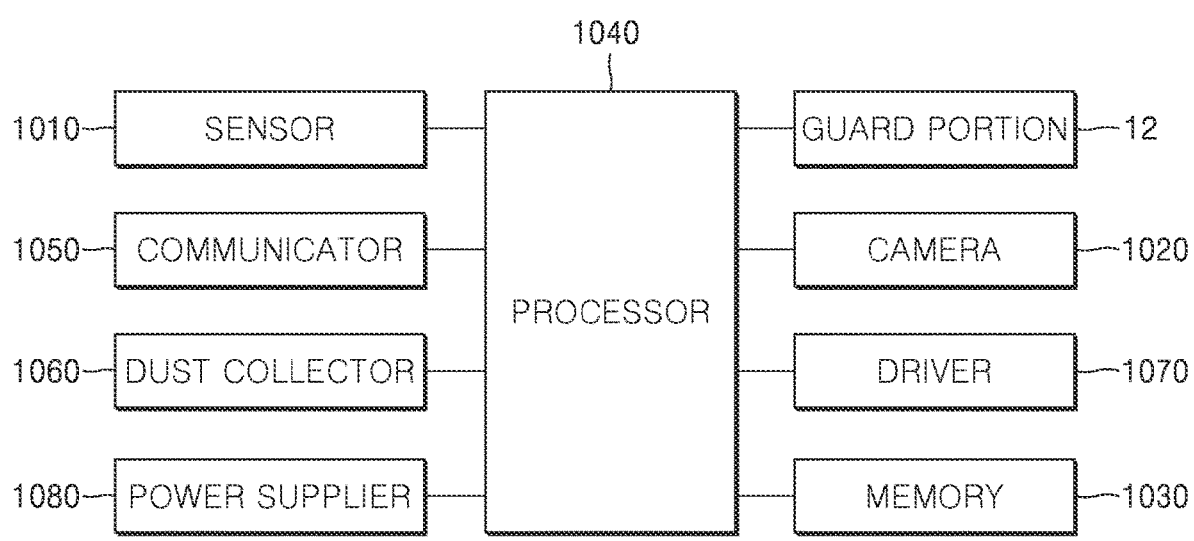
FIG. 14 is a block diagram of a configuration of a cleaning robot according to an embodiment of the disclosure.

According to an embodiment of the disclosure, the processor 1040 may control a communicator 1050 of FIG. 14 to transmit information about the captured image to the user terminal device 30. The processor 1040 may determine, upon receiving information about a user task selected by a user from the user terminal device 30, the user task as the task to be performed by the cleaning robot 10. In this case, the processor 1040 may apply, to at least one AI model, the captured image and the user task received from the user terminal device 30 as a training data set.

According to an embodiment of the disclosure, the processor 1040 may control the driver 1070 such that the object moves to a designated area. For example, the processor 1040 may determine a structure closest to the object from among a plurality of structures in the vicinity of the object, and control the driver 1070 such that the object is moved to the front of the determined structure. Alternatively, the processor 1040 may control the communicator 1050 to transmit information about the captured image and information about a map to the user terminal device 30. Upon receiving information about the designated area from the user terminal device 30, the processor 1040 may control the driver 1070 such that the object is moved to the designated area.

FIG. 14 is a block diagram of a configuration of a cleaning robot according to an embodiment of the disclosure.

Referring to FIG. 14, the cleaning robot 10 may include the guard portion 12, a sensor 1010, the camera 1020, the memory 1030, the communicator 1050, a dust collector 1060, the driver 1070, a power supplier 1080, and the processor 1040 controlling the above components by being electrically connected thereto.

Because the guard portion 12, the camera 1020, the memory 1030, the processor 1040, and the driver 1070 have been described with reference to FIGS. 13A and 13B, redundant details thereof are not provided again.

The sensor 1010 may include various types of sensors. More particularly, the sensor 1010 may include an IR stereo sensor, a LIDAR sensor, and an ultrasound sensor. The IR stereo sensor, the LIDAR sensor, and the ultrasound sensor may be implemented as one sensor or as separate sensors.

The IR stereo sensor may detect a 3D shape and distance information of an object. More particularly, the IR stereo sensor may obtain 3D depth information of the object. However, the IR stereo sensor is unable to detect black, a transparent color, or a metal.

The cleaning robot 10 may obtain a 2D line shape and distance information of the object by using the LIDAR sensor. Accordingly, a space and distance information of a surrounding object with respect to the object may be obtained. However, the LIDAR sensor is difficult to detect black, a transparent color, or a metal.

The ultrasound sensor may obtain distance information regarding an obstacle. The ultrasound sensor has a relatively limited sensing range but is able to detect black, a transparent color, and a metal.

In addition, the sensor 1010 may include a sensor for detecting the surroundings, such as a dust sensor, an odor sensor, a laser sensor, a UWB sensor, an image sensor, or an obstacle sensor, and a sensor for detecting a moving state, such as a gyro sensor or a global positioning system (GPS) sensor. Here, the sensor for detecting the surroundings and the sensor for detecting the moving state of the cleaning robot 10 may be configured as different configurations or may be configured as one configuration. In addition, each sensor of the sensor 1010 may be configured as separate configuration. The sensor 1010 may further include other various types of sensors, and may not include some of the sensors described above based on a task to be performed by the cleaning robot 10.

The communicator 1050 may transmit or receive data, a control command, or the like to or from an external device. For example, the communicator 1050 may receive information about a map including location information about a space where the cleaning robot 10 is to operate, from the external device. In addition, the communicator 1050 may transmit information for updating the information about the map, to the external device. As another example, the communicator 1050 may receive a signal for controlling the cleaning robot 10 transmitted from the user by using a remote controlling device. Here, the remote controlling device may be implemented in any one of various shapes, such as a remote controller, a user terminal device, and the like.

In addition, the communicator 1050 may transmit or receive data to or from an external server (not shown). For example, when an AI model is stored in the external server, the communicator 1050 may transmit an image captured by the camera 1020 to the external server and receive identification information of an object included in the captured image identified by using the AI model from the external server. However, this is only an example and the communicator 1050 may receive information about a movable area with respect to a space where the cleaning robot 10 is to perform a task, from the external server.

Meanwhile, the communicator 1050 may communicate with an external electronic device via a short range communication network, such as the Bluetooth, Wi-Fi direct, or infrared data association (IrDA), or via a telecommunication network, such as a cellular network, the Internet, or a computer network (for example, a local area network (LAN) or a wireless LAN (WLAN)).

The dust collector 1060 is a configuration for collecting dust. More particularly, the dust collector 1060 may suck the air and collect dust in the sucked air. For example, the dust collector 1060 may include a motor for passing the air through a guide pipe extending from a suction hole to a discharge hole, a filter for filtering the dust in the sucked air, and a dust container for the dust.

The driver 1070 may drive the cleaning robot 10. For example, the driver 1070 may move the cleaning robot 10 to a location where a task is to be performed, according to control of the processor 1040. In this case, the driver 1070 may include at least one wheel contacting a floor surface, a motor providing power to the wheel, and a driver for controlling the motor. As another example, the driver 1070 may realize an operation for performing a task. For example, the driver 1070 may include a motor and a rotation shaft for transmitting power such that the guard portion 12 is ascended or descended. For example, the driver 1070 may enable the guard portion 12 to ascend or descend by controlling the motor according to a control command of the processor 1040. For example, the control command may include information about a rotation direction, rotation speed, applied power of the motor.

The power supplier 1080 supplies power required to drive the cleaning robot 10. For example, the power supplier 1080 may be implemented as a battery capable of being charged and discharged. When remaining power of the cleaning robot 10 is below a pre-set level or when a task is completed, the processor 1040 may control the driver 1070 to move to a charging station. A charging method of the power supplier 1080 may include both contact and non-contact charging methods.

Figure 15A:
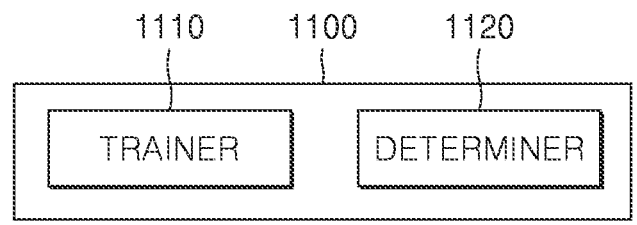
FIG. 15A is a block diagram of a trainer according to an embodiment of the disclosure.
Figure 15B:
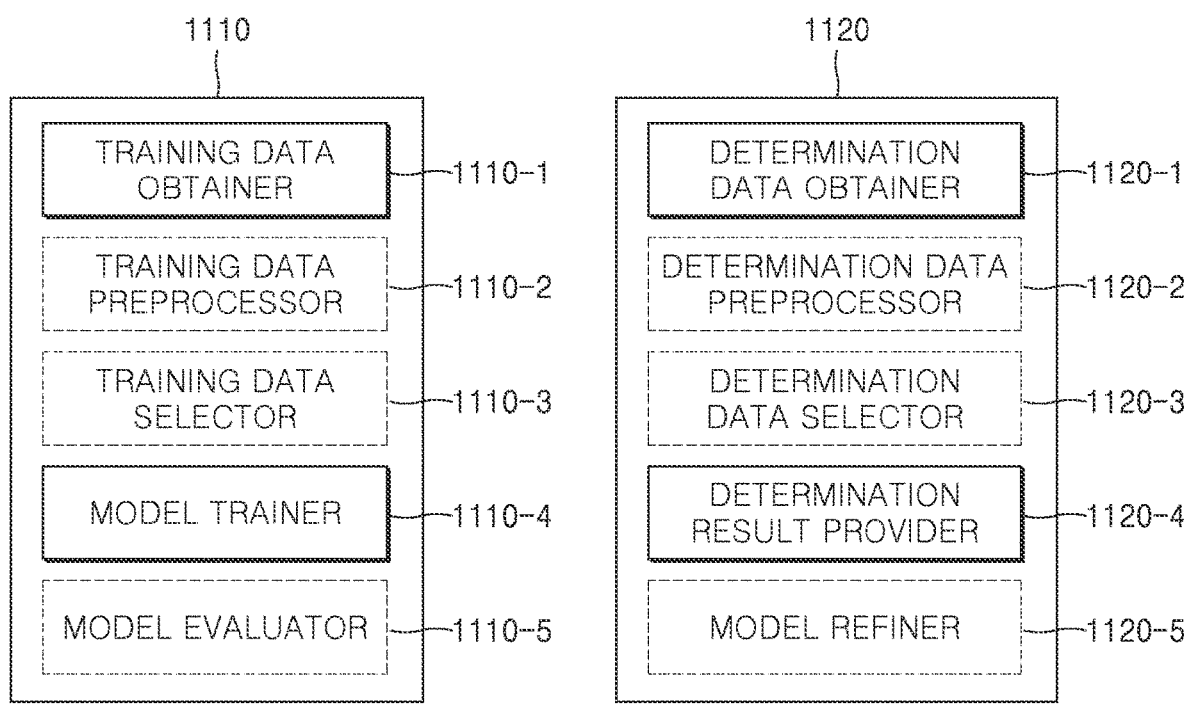
FIG. 15B is a block diagram of a determiner according to an embodiment of the disclosure.

FIGS. 15A and 15B are block diagrams of a trainer and a determiner according to an embodiment of the disclosure.

Referring to FIG. 15A, a processor 1100 may include at least one of the trainer 1110 or the determiner 1120. The processor 1100 of FIG. 15A may correspond to the processor 1040 of the cleaning robot 10 of FIGS. 13A, 13B, and 14, or may correspond to a processor of an external server (not shown) communicable with the cleaning robot 10.

The trainer 1110 may generate or train an AI model having a criterion for determining a certain situation. The trainer 1110 may generate the AI model having the criterion by using collected training data. For example, the trainer 1110 may generate, train, or refine the AI model having a criterion for determining an object included in an image, by using an image including an object as training data. As another example, the trainer 1110 may generate, train, or refine the AI model having a criterion for determining various types of additional information around an object included in an image, by using surrounding information included in an image including an object as training data. As another example, the trainer 1110 may generate, train, or refine the AI model having a criterion for determining an object included in an image, by using an image captured by a camera as training data. As another example, the trainer 1110 may generate, train, or refine the AI model configured to identify an object, by using {image including object, identification information of object} as a training data set. As another example, the trainer 1110 may generate, train, or refine the AI model configured to determine a task to be performed by the cleaning robot 10, by using {identification information of object, task to be performed by cleaning robot} as a training data set. As another example, the trainer 1110 may generate, train, or refine the AI model configured to determine a task to be performed by the cleaning robot 10, by using {image including object, task to be performed by cleaning robot} as a training data set.

The determiner 1120 may estimate an identification target included in certain data, by using the certain data as input data of the trained AI model.

For example, the determiner 1120 may obtain (or estimate or infer) object identification information regarding an object included in an image by using the image including the object as input data of the trained AI model. As another example, the determiner 1120 may determine a task to be performed by the cleaning robot 10 by applying an image obtained by capturing an object to at least one trained AI model. As another example, the determiner 1120 may determine a task to be performed by the cleaning robot 10 by applying identification information of an object to at least one AI model.

At least a part of the trainer 1110 and at least a part of the determiner 1120 may be implemented as a software module or may be manufactured in a form of at least one hardware chip and mounted on an electronic device. For example, at least one of the trainer 1110 or the determiner 1120 may be manufactured in a form of a dedicated hardware chip for AI, or may be manufactured as a part of an existing general-purpose processor (for example, a CPU or an AP) or a graphics-only processor (for example, a GPU) and mounted on the cleaning robot 10 described above. Here, the dedicated hardware chip for AI is a dedicated processor specialized in probability calculation, and may quickly process an arithmetic operation in AI fields, such as machine learning, owing to a high parallel processing performance compared to existing general-purpose processors. When the trainer 1110 and the determiner 1120 are implemented as the software module (or a program module including instructions), the software module may be stored in a non-transitory computer-readable recording medium. In this case, the software module may be provided by an OS or provided by a certain application. Alternatively, a part of the software module may be provided by the OS and the remaining may be provided by the certain application.

In this case, the trainer 1110 and the determiner 1120 may be mounted on one electronic device or may be mounted on separate electronic devices. For example, one of the trainer 1110 and the determiner 1120 may be included in the cleaning robot 10 and the other one may be included in an external server. In addition, the trainer 1110 and the determiner 1120 may be connected via wires or wirelessly such that model information built by the trainer 1110 may be provided to the determiner 1120 and data input to the determiner 1120 may be provided to the trainer 1110 as additional training data.

FIG. 15B is a block diagram of a trainer and a determiner according to an embodiment of the disclosure.

Referring to FIG. 15B, the trainer 1110 according to some embodiments of the disclosure may include a training data obtainer 1110-1 and a model trainer 1110-4. In addition, the trainer 1110 may selectively further include at least one of a training data preprocessor 1110-2, a training data selector 1110-3, or a model evaluator 1110-5.

The training data obtainer 1110-1 may obtain training data required for an AI model to infer an identification target. According to an embodiment of the disclosure, the training data obtainer 1110-1 may obtain, as the training data, an entire image including an object and an image corresponding to an area corresponding to an object. The training data may be data collected or tested by the trainer 1110 or a manufacturer of the trainer 1110.

The model trainer 1110-4 may train the AI model to have a criterion about how to determine a certain identification target, by using the training data. For example, the model trainer 1110-4 may train the AI model through supervised learning using at least some of the training data as a criterion. Alternatively, the model trainer 1110-4 may train the AI model through unsupervised learning by discovering a criterion for determining a situation through, for example, self-training using the training data without separate supervision. In addition, the model trainer 1110-4 may train the AI model through, for example, reinforced learning using feedback about whether a result of determining a situation according to learning is correct. In addition, the model trainer 1110-4 may train the AI model by using a learning algorithm including, for example, error back-propagation or gradient descent.

In addition, the model trainer 1110-4 may learn a selection criterion about which training data is to be used to estimate an identification target by using input data.

When a plurality of pre-built AI models are present, the model trainer 1110-4 may determine an AI model having a high correlation between input training data and basic training data as an AI model to be trained. In this case, the basic training data may be pre-classified according to types of data, and the AI model may be pre-built for each type of data. For example, the basic training data may be pre-classified based on various standards, such as a region where training data is generated, a time when training data is generated, the size of training data, a genre of training data, a generator of training data, and a type of object in training data.

When the AI model is trained, the model trainer 1110-4 may store the trained AI model. In this case, the model trainer 1110-4 may store the trained AI model in the memory 1030 of the cleaning robot 10. Alternatively, the model trainer 1110-4 may store the trained AI model in a memory of a server connected to the cleaning robot 10 via a wired or wireless network.

The trainer 1110 may further include the training data preprocessor 1110-2 and the training data selector 1110-3 to improve an analysis result of the AI model or to reduce resources or time required to generate the AI model.

The training data preprocessor 1110-2 may preprocess obtained data such that the obtained data is used in training for determining a situation. The training data preprocessor 1110-2 may process the obtained data to a pre-set format such that the model trainer 1110-4 is able to use the obtained data in training for determining a situation.

The training data selector 1110-3 may select data required for training from among data obtained by the training data obtainer 1110-1 or data preprocessed by the training data preprocessor 1110-2. The selected training data may be provided to the model trainer 1110-4. The training data selector 1110-3 may select the training data required for training from among obtained or preprocessed data according to a pre-set selection criterion. In addition, the training data selector 1110-3 may select the training data according to a selection criterion pre-set according to training by the model trainer 1110-4.

The trainer 1110 may further include the model evaluator 1110-5 to improve the analysis result of the AI model.

The model evaluator 1110-5 may input evaluation data to the AI model and when the analysis result output from the evaluation data does not satisfy a certain standard, re-train the model trainer 1110-4. In this case, the evaluation data may be pre-defined data for evaluating the AI model.

For example, the model evaluator 1110-5 may evaluate that the certain standard is not satisfied when the number or ratio of pieces of evaluation data of which an analysis result is not accurate from among analysis results of the trained AI model with respect to the evaluation data exceeds a pre-set threshold value.

Meanwhile, when a plurality of trained AI models are present, the model evaluator 1110-5 may evaluate whether each trained AI model satisfies the certain standard and determine an AI model satisfying the certain standard as a final AI model. At this time, when there are a plurality of AI models that satisfy the certain standard, the model evaluator 1110-5 may determine a pre-set one or certain number of AI models as the final AI model, in an order from a high evaluation score.

Referring to FIG. 12B, the determiner 1120 according to some embodiments of the disclosure may include a determination data obtainer 1120-1 and a determination result provider 1120-4.

In addition, the determiner 1120 may selectively further include at least one of a determination data preprocessor 1120-2, a determination data selector 1120-3, or a model refiner 1120-5.

The determination data obtainer 1120-1 may obtain data required to determine a situation. The determination result provider 1120-4 may determine a situation by applying the data obtained by the determination data obtainer 1120-1 to a trained AI model, as an input value. The determination result provider 1120-4 may provide an analysis result according to an analysis purpose of data. The determination result provider 1120-4 may obtain the analysis result by applying data selected by the determination data preprocessor 1120-2 or the determination data selector 1120-3 described later to the AI model, as an input value. The analysis result may be determined by the AI model.

For example, the determination result provider 1120-4 may obtain (or estimate) identification information of an object by applying an image obtained by capturing an object to at least one trained AI model, the image being obtained by the determination data obtainer 1120-1. As another example, the determination result provider 1120-4 may determine a task to be performed by the cleaning robot 10 by applying the image obtained by capturing the object to the at least one trained AI model, the image being obtained by the determination data obtainer 1120-1. As another example, the determination result provider 1120-4 may determine the task to be performed by the cleaning robot 10 by applying the identification information of the object obtained by the determination data obtainer 1120-1 to the at least one AI model.

The determiner 1120 may further include the determination data preprocessor 1120-2 and the determination data selector 1120-3 to improve an analysis result of the AI model or to reduce resources or time for providing the analysis result.

The determination data preprocessor 1120-2 may preprocess the obtained data such that the obtained data is used to determine a situation. The determination data preprocessor 1120-2 may provide the obtained data in a pre-defined format such that the determination result provider 1120-4 uses the obtained data to determine a situation.

The determination data selector 1120-3 may select data required to determine a situation from among the data obtained by the determination data obtainer 1120-1 or the data preprocessed by the determination data preprocessor 1120-2. The selected data may be provided to the determination result provider 1120-4. The determination data selector 1120-3 may select some or all of the obtained or preprocessed data according to a pre-set selection criterion for determining a situation. In addition, the determination data selector 1120-3 may select the data according to a selection criterion pre-set according to training by the model trainer 1110-4.

The model refiner 1120-5 may control the AI model to be refined, based on an evaluation regarding the analysis result provided by the determination result provider 1120-4. For example, the model refiner 1120-5 may request the model trainer 1110-4 to additionally train or refine the AI model by providing the analysis result provided by the determination result provider 1120-4 to the model trainer 1110-4.

According to an embodiment of the disclosure, the determiner 1120 may be located in a server (not shown) and the determiner 1120 may be located in the cleaning robot 10. In this case, the cleaning robot 10 and the server may interwork with each other to learn and determine data.

For example, the server may learn a criterion for determining a situation and the cleaning robot 10 may determine a situation based on a learning result by the server. In this case, the model trainer 1110-4 of the server may learn a criterion about which image of an object to use to determine a certain situation and about how to determine a situation by using data.

In addition, the determination result provider 1120-4 of the cleaning robot 10 may determine the identification information of the object or the task to be performed by the cleaning robot 10 by applying the data selected by the determination data selector 1120-3 to the AI model generated by the server. Alternatively, the determination result provider 1120-4 of the cleaning robot 10 may receive the AI model generated by the server from the server and determine a situation by using the received AI model. In this case, the determination result provider 1120-4 of the cleaning robot 10 may determine the identification information of the object or the task to be performed by the cleaning robot 10 by applying the image of the object selected by the determination data selector 1120-3 to the AI model received from the server.

FIG. 16 is a flowchart of a method, performed by a cleaning robot of performing a task according to an embodiment of the disclosure.

Referring to FIG. 16, first, the cleaning robot 10 may capture an image of an object in the vicinity of the cleaning robot 10 at operation 1301.

The cleaning robot 10 may determine a task to be performed by the cleaning robot 10 by applying the captured image to at least one trained AI model at operation 1303. For example, the cleaning robot 10 may obtain identification information of the object by applying the captured image to a first AI model. The cleaning robot 10 may determine the task to be performed by the cleaning robot 10 by applying the obtained identification information of the object to a second AI model.

When the task is determined, the cleaning robot 10 may control the guard portion 12 to descend from an opened portion of the cleaning robot 10 to a floor surface, according to the determined task at operation 1305.

When the guard portion 12 is descended, the cleaning robot 10 may move towards the object such that the object is moved by the descended guard portion 12 at operation 1307.

According to an embodiment of the disclosure, the cleaning robot 10 may determine a path for moving the object along. The cleaning robot 10 may move towards the object along the determined path.

According to an embodiment of the disclosure, the cleaning robot 10 may control the guard portion 12 to ascend after the object is moved. Then, the cleaning robot 10 may drive on the floor surface where the object was located before being moved.

According to an embodiment of the disclosure, the cleaning robot 10 may transmit information about the captured image to the user terminal device 30. Upon receiving information about a user task selected by the user from the user terminal device 30, the cleaning robot 10 may determine the user task as the task to be performed by the cleaning robot 10. In this case, the cleaning robot 10 may apply the captured image and the user task received from the user terminal device 30 to the at least one AI model, as a training data set.

According to an embodiment of the disclosure, the cleaning robot 10 may move the object to a designated area. For example, the cleaning robot 10 may determine a structure closest to the object from among a plurality of structures in a vicinity of the object. The cleaning robot 10 may move the object to the front of the determined structure. As another example, the cleaning robot 10 may transmit information about the captured image and information about a map to the user terminal device 30. In this regard, the cleaning robot 10 may receive information about the designated area from the user terminal device 30. Upon receiving the information about the designated area, the cleaning robot 10 may move the object to the designated area.

According to an embodiment of the disclosure, the cleaning robot 10 may store a local driving plan for the cleaning robot 10 with respect to an area where the object is located. After the object is moved, the cleaning robot 10 may update the local driving plan.

According to an embodiment of the disclosure described above, a cleaning robot may identify an image obtained by capturing an object and perform an optimum task, such as avoiding or moving the object.

According to an embodiment of the disclosure, because the cleaning robot is able to move the object by using a guard portion, it is possible to organize the object while cleaning and reduce a situation in which the cleaning robot gets caught at the object.

According to an embodiment of the disclosure, it is possible to clean a floor surface where the object was located before being moved, and thus as many areas as possible inside a house may be cleaned.

According to an embodiment of the disclosure, a possibility in which the cleaning robot provides an optimum task considering the object may be increased by using, as training data, the captured image and a user task selected by a user.

According to an embodiment of the disclosure, efficient driving of the cleaning robot is possible because a local driving plan for the cleaning robot is updated after the object is moved.

Various embodiments of the disclosure may be implemented in a moving device. Examples of the moving device include various types, such as a service robot for a public place, a transport robot at a production site, an operator assistance robot, a housework robot, a security robot, and an autonomous vehicle.

The term "module" as used in the disclosure may include a unit implemented in hardware, software, or firmware, and may be used interchangeably with a term, such as a logic, a logic block, a component, or circuit. The module may be an integral component or a minimum unit or part of the component, which performs one or more functions. For example, according to one embodiment of the disclosure, the module may be implemented in a form of an application-specific integrated circuit (ASIC).

Various embodiments of the disclosure may be implemented as software (for example, a program) including one or more instructions stored in a storage medium (for example, the memory 1030 or a memory (not shown) of a server (not shown)) readable by a machine (for example, the cleaning robot 10 or the server communicable with the cleaning robot 10). For example, a processor (for example, the processor 1040 or a processor (not shown) of the server) of the machine may call, from the storage medium, at least one instruction from among the stored one or more instructions and execute the at least one instruction. This enables the machine to operate to perform at least one function according to the called at least one instruction. The one or more instructions may include a code generated by a compiler or a code executable by an interpreter. The storage medium readable by the machine may be provided in a form of a non-transitory storage medium. Here, the term 'non-transitory' only means that the storage medium is not tangible and does not include a signal (for example, electromagnetic waves), and the term does not distinguish a case in which data is stored in the storage medium semi-permanently and a case in which the data is stored in the storage medium temporarily.

According to an embodiment of the disclosure, a method according to various embodiments of the disclosure may be provided by being included in a computer program product. The computer program product may be traded between a seller and a buyer as a product. The computer program product may be distributed in a form of a machine-readable storage medium (for example, a compact disc read-only memory (CD-ROM)) or distributed (for example, downloaded or uploaded) online through an application store (for example, Play Store™) or directly between two user devices (for example, smart phones). In case of online distribution, at least a portion of the computer program product may be stored at least temporarily or temporarily generated on a machine-readable storage medium, such as a server of a manufacturer, a server of an application store, or a memory of a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a cleaning robot, of performing a task, the method comprising:
    capturing an image of an object in a vicinity of the cleaning robot;
    determining a type of the object, by applying the captured image to at least one trained artificial intelligence (AI) model; and
    determining driving path of the cleaning robot, according to the type of the object,
    wherein the driving path includes:
        performing moving in close contact with the object when the type of the object is determined to be a fixed object or a hard to move object,
        performing moving away from the object by a certain distance when the type of the object is determined to be a fragile object, and
        performing interaction toward the object when the type of the object is determined to be at least one of a person, a body part of a person, and animal.

2. The method of claim 1,
    wherein the object is determined as a first object, and
    wherein the driving path of the cleaning robot is determined as close avoidance driving in which a first distance is spaced apart from the first object.

3. The method of claim 2,
    wherein the first object has a property of being fixed in the area or difficult to move, and
    wherein the first distance is less than 1 cm.

4. The method of claim 2, further comprising:
measuring distance information between the first object and the cleaning robot in real time,
wherein the driving path of the cleaning robot is determined such that the cleaning robot is separated from the first object by the first distance.

5. The method of claim 1,
wherein the object is determined as a second object, and
wherein the driving path of the cleaning robot is determined as complete avoidance driving in which a second distance is spaced apart from the second object.

6. The method of claim 5,
wherein the second object has a fragile property or a contamination possibility property, and
wherein the second distance is 1 cm or more and 15 cm or less.

7. The method of claim 5, further comprising:
measuring distance information between the second object and the cleaning robot in real time,
wherein the driving path of the cleaning robot is determined such that the cleaning robot is separated from the second object by the second distance.

8. The method of claim 5, further comprising:
measuring distance information between the second object and the cleaning robot in real time,
wherein a virtual wall is set in a second area separated from a second object by the second distance, and the cleaning robot drives in close contact with the virtual wall.

9. The method of claim 1,
wherein the object is determined as a second object, and
wherein the cleaning robot performs an interaction toward a third object.

10. The method of claim 9, wherein the third object has a property of reacting to the interaction.

11. The method of claim 10, further comprising:
measuring a position of the third object moved in response to the interaction and distance information between the third object and the cleaning robot in real time,
wherein the driving path of the cleaning robot is determined such that the cleaning robot is separated from the second object by a predetermined distance.

12. The method of claim 1, wherein the determining of the task to be performed by the cleaning robot comprises:
obtaining identification information of the object by applying the captured image to a trained first AI model; and
determining the driving path of the cleaning robot by applying the obtained identification information of the object to a trained second AI model.

13. A cleaning robot comprising:
a camera;
a driver; and
at least one processor configured to:
control the camera to capture an image of an object in a vicinity of the cleaning robot,
determine a type of the object, by applying the captured image to at least one trained artificial intelligence (AI) model,
determine driving path of the cleaning robot, according to the type of the object, and
control the driver to drive the cleaning robot towards the object according to the driving path of the cleaning robot,
wherein the driving path includes:
performing moving in close contact with the object when the type of the object is determined to be a fixed object or a hard to move object,
performing moving away from the object by a certain distance when the type of the object is determined to be a fragile object, and
performing interaction toward the object when the type of the object is determined to be at least one of a person, a body part of a person, and animal.

* * * * *